United States Patent [19]

Ogawa

[11] Patent Number: 5,102,686
[45] Date of Patent: Apr. 7, 1992

[54] PROCESS FOR PRODUCING A POLYACETYLENE

[75] Inventor: Kazufumi Ogawa, Hirakata, Japan

[73] Assignee: Matsushita Electric Industrial Co., Ltd., Osaka, Japan

[21] Appl. No.: 593,464

[22] Filed: Oct. 3, 1990

Related U.S. Application Data

[63] Continuation of Ser. No. 258,616, Oct. 12, 1988, abandoned.

[30] Foreign Application Priority Data

Oct. 15, 1987 [JP] Japan .................. 62-260291
Oct. 15, 1987 [JP] Japan .................. 62-260293

[51] Int. Cl.$^5$ .................. B05D 3/06; B29C 35/08
[52] U.S. Cl. .................. 427/36; 264/22; 264/298; 427/35; 427/44
[58] Field of Search .......... 264/22, 298; 526/285; 204/164; 522/182; 427/35, 36, 44

[56] References Cited

U.S. PATENT DOCUMENTS 3,923,622 12/1975 Baughman et al. ............ 204/159.22
4,439,514  3/1984 Garito .................. 430/270
4,536,450  8/1985 Garito .................. 430/270
4,564,492  1/1986 Bott et al. .............. 264/104
4,798,740  1/1989 Tomida ................. 430/281

OTHER PUBLICATIONS

Day et al., "Polymerization of Diacetylene Carbonic Acid Monolayers at the Gas-Water Interface", Journal of Polymer Science: Polymer Letters Edition, vol. 16, 1978, pp. 205-210.
K. Ogawa, "Study on Polymerization Mechanism of Pentacosadiynoic Acid Langmuir-Blodgett Films Using High Energy Beam Irradiations", J. Phys. Chem., 1989, 93 5305-5310.
ITEJ, Technical Report, vol. 11, No. 4, pp. 13-18 Ed '87, May 1987.

Primary Examiner—James Lowe
Attorney, Agent, or Firm—Stevens, Davis, Miller & Mosher

[57] ABSTRACT

The present invention provides a process for producing a polyacetylene which is stable even in an atmosphere containing oxygen, by spreading onto the surface of water, which contains Ca-salt, a solution of a fatty acid series substance containing an acetylene group or diacetylene group dissolved in an organic solvent, removing the organic solvent by evaporation, gathering up molecules of the fatty acid series substance which remain on the water by means of a barrier, then irradiating the molecules in the state of a monomolecular film on the water surface by use of radiation, or by building up the molecules by means of Langmuir-Blodgett (LB) film method under a definite surface pressure.

12 Claims, 32 Drawing Sheets

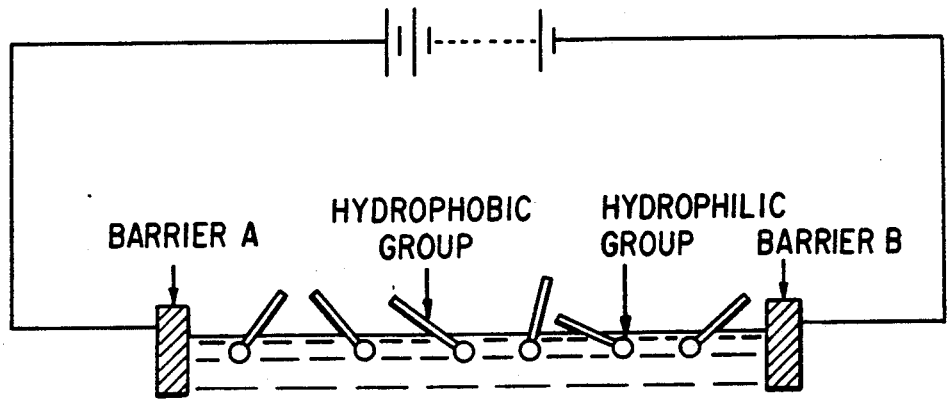
F I G. 30
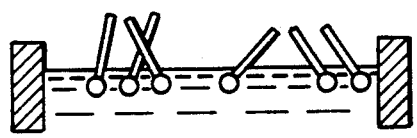
F I G. 31
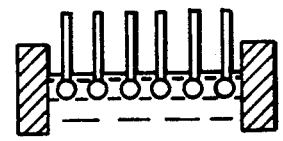
F I G. 32
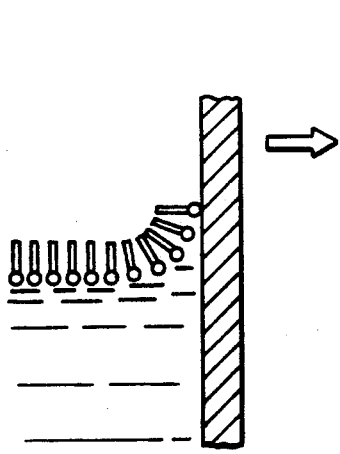
F I G. 33(a)
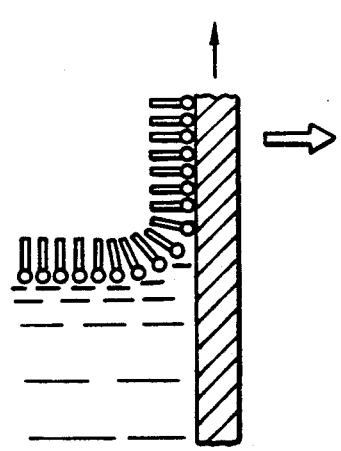
F I G. 33(b)
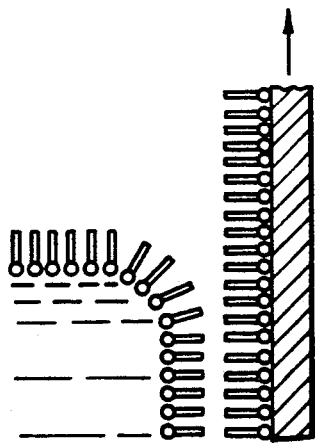
F I G. 33(c)

Y-TYPE STRUCTURE

X-TYPE STRUCTURE

Z-TYPE STRUCTURE

PROCESS FOR PRODUCING A POLYACETYLENE

This application is a Continuation of application Ser. No. 258,616, filed Oct. 12, 1988 now abandoned.

BACKGROUND OF THE INVENTION

The present invention relates to an electric material. More particularly, it relates to an organic substance having a polyacetylene linkage which exhibits electrical conductivity and nonlinear optical effect.

Polymers of acetylene derivatives have been extensively studied as optical and electronic functional materials because they contain in the molecule a primary main chain having a $\pi$ electron conjugation system, so that they have electrical conductivity and nonlinear optical effect.

As a method for producing a polyacetylene, there is well known the polymerization method of Shirakawa et al. using a Ziegler-Natta catalyst.

On the other hand, it is well known that use of an amphipatic acetylene derivative having both hydrophobic group and hydrophilic group permits formation of a monomolecular film on water surface and formation of a built-up film by the Langmuir-Blodgett (LB) technique.

The LB technique is a method which in recent years, has been considered hopeful as one constructing means in development of molecular devices in which molecules themselves have functions. When the LB technique is employed, a monomolecular film of an acetylene derivative of several tenths Angstrom order can be formed and a built-up film thereof can easily be obtained.

PRINCIPLE OF THE FORMATION OF LB MONOMOLECULAR FILM AND METHOD FOR PREPARING THE SAME

When a substance having both a hydrophilic group (e.g., carboxyl group, —COOH) and a hydrophobic group (e.g., methylene group, —(CH$_2$)$_n$—) in the molecule is dissolved in a non-aqueous volitile solvent (e.g., chloroform), and the resultant solution dropped onto the surface of water, the molecules of said substance are spread out on the surface of the water to form a monomolecular film, wherein the hydrophilic group is oriented at the water-air interface and the hydrophilic group is placed in the air. This is illustrated in FIG. 30.

The next step is to subject the spread out molecules in the monomolecular film to a certain surface pressure by using barriers (A) and (B) to decrease the area of the surface of the water occupied by these molecules; see FIG. 31. Finally, the molecules which are spread on the surface of the water will form a solid-like film (i.e., monomolecular film), having a good orderly orientation of the molecules due to the specific surface pressure being applied thereto as shown in FIG. 32. In this case, when a certain strength of direct current is applied to said monomolecular film through barriers A and B, the orientation of the molecules can be considerably improved due to the reason that the carboxyl groups which exist at the water-air interface, are charged negative (—), so that these molecules are pulled to the positive (+) electrode side.

Under such conditions, by keeping the surface pressure constant, when a substrate (e.g., a glass plate), having hydrophilicity on its surface, is vertically dipped into and out of the water surface where the monomolecular film is transferred and deposited on the surface of the substrate (FIG. 33a). By repeating said operations, the monomolecular films are built up on the surface of the substrate as in the order of molecular level; see FIGS. 33(b) and (c). Furthermore, a detailed explanation is provided on page 93 of MEMBRANE MIMETIC CHEMISTRY by J. H. Fendler, published by John Wiley and Sons (1982).

Generally, the built-up monomolecular films are transferred onto the surface of substrate when the substrate is vertically moved by dipping into and out of water surface with the built-up film form as a structure (Y-type) as shown in FIG. 34(a). On the other hand, when the substrate is vertically moved only by dipping into water surface, the built-up film thus obtained forms another structure (X-type) as shown in FIG. 34(b). Furthermore, when the substrate is vertically moved only by dipping out from water surface, the resultant built-up film forms different structure (Z-type) as shown in FIG. 34(c).

The physical conditions (i.e., the density of the molecules in the monomolecular film and the orientation thereof) of the resultant monomolecular film being built up on the surface of water varies depending on the conditions of water phase (i.e., temperature and the concentration of salts contained in the water phase).

Monomolecular film being formed on the surface of water is called "Langmuir film (l-film)" after the name of the inventor who developed this type of film, and monomolecular film built up on the substrate is called as "Langmuir-Blodgett film (LB-film)".

However, polyacetylene derivatives now known are unstable to heat, pressure, ultraviolet rays, etc. in an atmosphere containing oxygen, and thereform study of their stabilization is in progress.

But, no method for stabilizing an acetylene derivative polymer has been found.

On the other hand, a diacetylene polymer forms a primary main chain having a $\pi$ electron conjugated system by polymerization reaction in solid state to give a polymer of polydiacetylene. This polymer has electrical conductivity and nonlinear optical effect and hence has been extensively studied as an optical and electronic functional material.

Accordingly, there have been made various studies of polymerization processes for a LB film using a diacetylene derivative. Furthermore, it has recently become apparent that the photosensitivity of diacetylene derivative is greatly dependent on the orientation of the diacetylene group. Since side chain groups play an important role in the molecular orientation, the photosensitivity has been studied in detail for substituted diacetylene derivatives various in their side chains as substituents.

In addition, since the hue of many polydiacetylene LB films is changed dramatically from blue to red by heat, pressure, ultraviolet rays, etc., enthusiastic study has been pursued with regard also to the hue change.

However, there has been known no method for producing "polyacetylene" by the use of a diacetylene derivative LB film.

SUMMARY OF THE INVENTION

The gist of the present invention is a process by which a polyacetylene which is stable even in an atmosphere containing oxygen can be produced by spreading on a water surface a solution of a fatty acid series substance containing an acetylene group dissolved in an organic solvent, evaporating the organic solvent, gathering up molecules of the substance containing an acetylene group which remain on the water surface, in the water surface direction on the water surface by means of a barrier, and polymerizing the molecules in a state of monomolecular film on the water surface, i.e., Langmuir (L) film by the use of radiation such as X-rays, electron beams, γ-rays, etc. while applying a predetermined surface pressure, or by building up LB film of an acetylene derivative into a film on a predetermined substrate under a definite surface pressure, and subjecting the LB films to polymerization by the use of such radiation as described above.

That is, the present inventors have found that a straight-chain, ultra-high-molecular-weight (ultra-conjugated and high-molecular-weight) polyacetylene having a continuous conjugated system can be produced by subjecting molecules of an acetylene derivative to radiation polymerization while compressing the same under a definite surface pressure.

Furthermore, the present inventors have found that when a DC bias is applied in the surface direction during the radiation polymerization of the L film or building-up of the LB films into a film, a polyacetylene having a longer continuous conjugated system can be obtained.

That is, a straight-chain, ultra-high-molecular-weight polyacetylene having a continuous conjugated system can be produced by subjecting acetylene derivative LB films built up into a film on a predetermined substrate under a definite surface pressure or an acetylene derivative L film spread on water surface to radiation polymerization by the use of radiation such as X-rays, electron beams, γ-rays, etc. while applying a definite surface pressure to the LB films or the L film, and thereby compensating the decrease of the area of molecule during the polymerization. In other words, by compressing acetylene derivative molecules aligned in monomolecular state at a constant pressure, conditions under which the radiation polymerization reaction of the acetylene derivative monomer lasts without a break can be maintained, whereby spaces formed by molecular shrinkage during the polymerization can be filled, so that a straight-chain, ultra-high-molecular-weight polyacetylene having a continuous conjugated system can be produced.

When a DC bias is applied in the surface direction during the gathering-up of acetylene derivative molecules in the surface direction on the water surface by means of a barrier or during radiation polymerization, the orientation of monomer molecules is further improved and production of a polyacetylene having a still longer conjugated system becomes possible.

Furthermore, in making the present invention, there has been developed a method by which optical measurement such as UV spectroscopy and the like can be carried out by real time while monitoring a π-A curve, in a monomolecular film on water surface, i.e., a Langmuir (L) film. Using this method, the relationship between the photoreactivity of a diacetylene derivative L film to ultraviolet irradiation and the molecular density or the molecular orientation was investigated in detail, and the reactivity to radiation of diacetylene derivative LB films built up into a film at a typical molecular density. Consequently, the present inventors have found the following fact. When a diacetylene derivative L film is subjected to polymerization by the use of ultraviolet rays below a certain surface pressure or diacetylene derivative LB films are built up into a film on a predetermined substrate below a certain surface pressure and then subjected to polymerization by the use of ultraviolet rays, a polydiacetylene type organic polymer can be produced but a polyacetylene type organic polymer cannot be produced under such conditions.

We, the present inventors, however, found that when a diacetylene derivative in a state of monomolecular film on water surface, i.e., L film is polymerized by the use of radiation such as X-ray, electron beams, γ-rays, etc. while compressing the same above a certain surface pressure or diacetylene derivative LB films are built up into a film on a predetermined substrate above a certain surface pressure and then subjected to polymerization by the use of such radiation as described above, a polyacetylene linkage is formed. That is, we found that a straight-chain, ultra-high-molecular-weight (ultra-conjugated and high-molecular-weight) polyacetylene having a continuous conjugated system can be produced by subjecting diacetylene derivative molecules to radiation polymerization while compressing the same above a certain surface pressure.

We also found that when a DC bias is applied in the surface direction during the photopolymerization of the L film or building-up of the LB films into a film, a polyacetylene having a still longer conjugated system can be produced.

That is, we found that a straight-chain, ultra-high-molecular-weight polyacetylene having a continuous conjugated system can be produced by subjecting diacetylene LB films built up into a film on a predetermined substrate above a certain surface pressure or a diacetylene derivative L film to radiation polymerization while applying a surface pressure above a certain value, and thereby compensating the decrease of the molecular area during the photopolymerization. In other words, we found that a straight-chain, ultra-high-molecular-weight polyacetylene having a continuous conjugated system can be produced by compressing diacetylene molecules aligned in monomolecular state at a constant pressure, and thereby filling spaces formed by molecular shrinkage during the photopolymerization to maintain conditions under which the radiation polymerization reaction of diacetylene monomer lasts without a break.

In addition, when diacetylene derivative molecules are gathered up in the surface direction on water surface or a DC bias is applied in the surface direction during the photopolymerization, the orientation of monomer molecules is further improved. Thus, production of a polyacetylene having a still longer conjugated system has become possible.

BRIEF DESCRIPTION OF THE DRAWINGS

FIG. 7 is a schematic illustrating of a multi-channel photometric system for evaluating a L film and FIG. 8 a schematic illustration of a light path near a L film sample.

FIG. 9 shows $\pi$-A curves of a typical pentacosadiynoic acid (PDA).L film,

FIG. 10 the change of the $\pi$-A curves accompanying light irradiation of the PDA.L film on the surface of an aqueous salt solution having a high concentration, FIG. 11 the change of the $\pi$-A curves accompanying light irradiation of the PDA.L film on the surface of an aqueous salt solution having a low concentration, FIG. 12 the change of the $\pi$-A curves accompanying light irradiation of the PDA L film on the surface of pure water, FIG. 13 the change of surface pressure accompanying light irradiation of the PDA.L film on the surface of an aqueous salt solution having a high concentration, and FIG. 14 the change of surface pressure accompanying light irradiation of the PDA.L film on the surface of an aqueous salt solution having a low concentration.

FIG. 20($a$) is a graph showing the change of surface pressure accompanying barrier movement, and FIG. 20($b$) a graph showing the change of absorption intensity at 242 nm accompanying barrier movement.

FIG. 21($a$) is a graph showing the change of surface pressure accompanying barrier movement, and FIG. 21($b$) a graph showing the change of absorption intensity at 242 nm accompanying barrier movement.

FIG. 26($a$) is a diagram showing an ultraviolet polymerization process of the PDA.L film, and FIG. 26($b$) a diagram showing an ultraviolet degradation process of a poly-PDA.L film.

FIGS. 30–33($c$) explain the known technique of forming an LB film.

FIG. 34($b$) shows the X-type structure of a built-up film.

FIG. 34($c$) shows the Z-type structure of a built-up film.

DETAILED DESCRIPTION OF THE INVENTION

Example 1

Although various samples were used, an explanation is given by taking the case of $\omega$-tricosynoic acid (TCA) $CH\equiv C-(CH_2)_{20}-COOH$ which is an acetylene derivative.

Radiation polymerization of a L film and build-up of LB films into a film were carried out by use of Trought IV mfd. by Joice-Loebl Co., Ltd. in a clean room of class 10 illuminated with yellow light free from light having a wavelength of 500 nm or shorter. In this case, the temperature and humidity inside the clean room were adjusted to $23°\pm1°$ C. and $40\pm5\%$, respectively. When 25 LB films were built up into a film, the building-up was wholly of Y type. For the building-up, a Si substrate of 3 inches in diameter having an oxide layer formed thereon was used. As radiation for the radiation polymerization reaction, X-rays and electron beans were used. FTIR spectra were measured for confirming the polymerization of L film and LB films on water surface.

Figure 1:
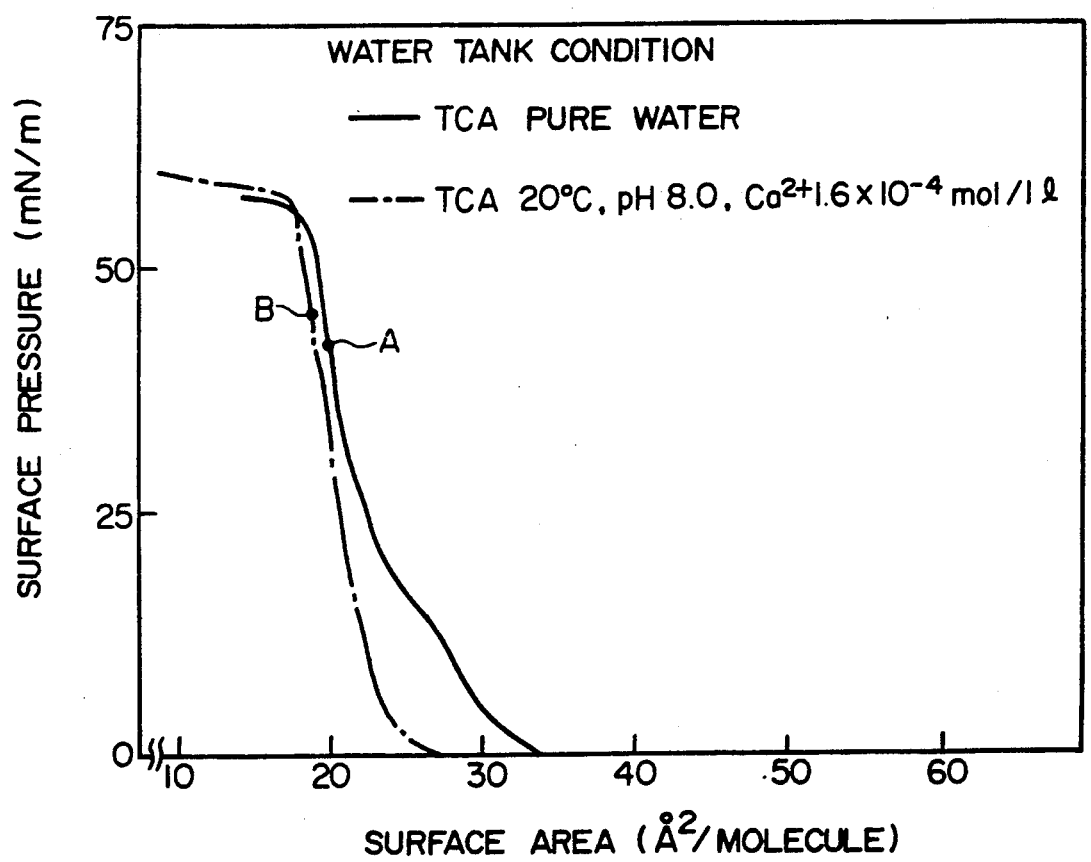
FIG. 1 shows π-A curves of a ω-tricosynoic acid (TCA).L film under two typical water tank conditions.

First, in order to confirm the difference of molecular density or molecular orientation, the surface pressure-molecular occupied area characteristic (the $\pi$-A curve) of a TCA.L film was measured at various salt concentrations of aqueous phase and at various pH's. In FIG. 1 are shown $\pi$-A curves under two typical water bath conditions.

Figure 2:
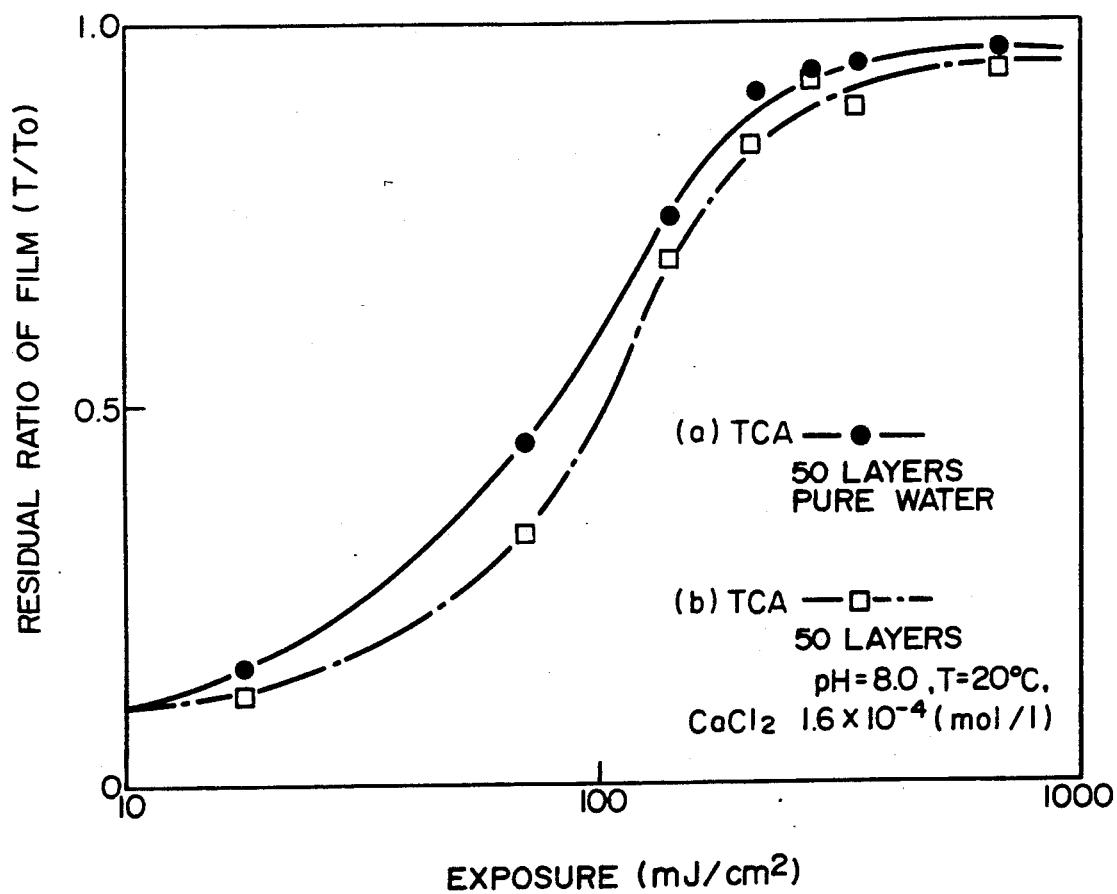
FIG. 2 is a gamma characteristic graph of a TCA.LB film in the case of X-ray irradiation.
Figure 3:
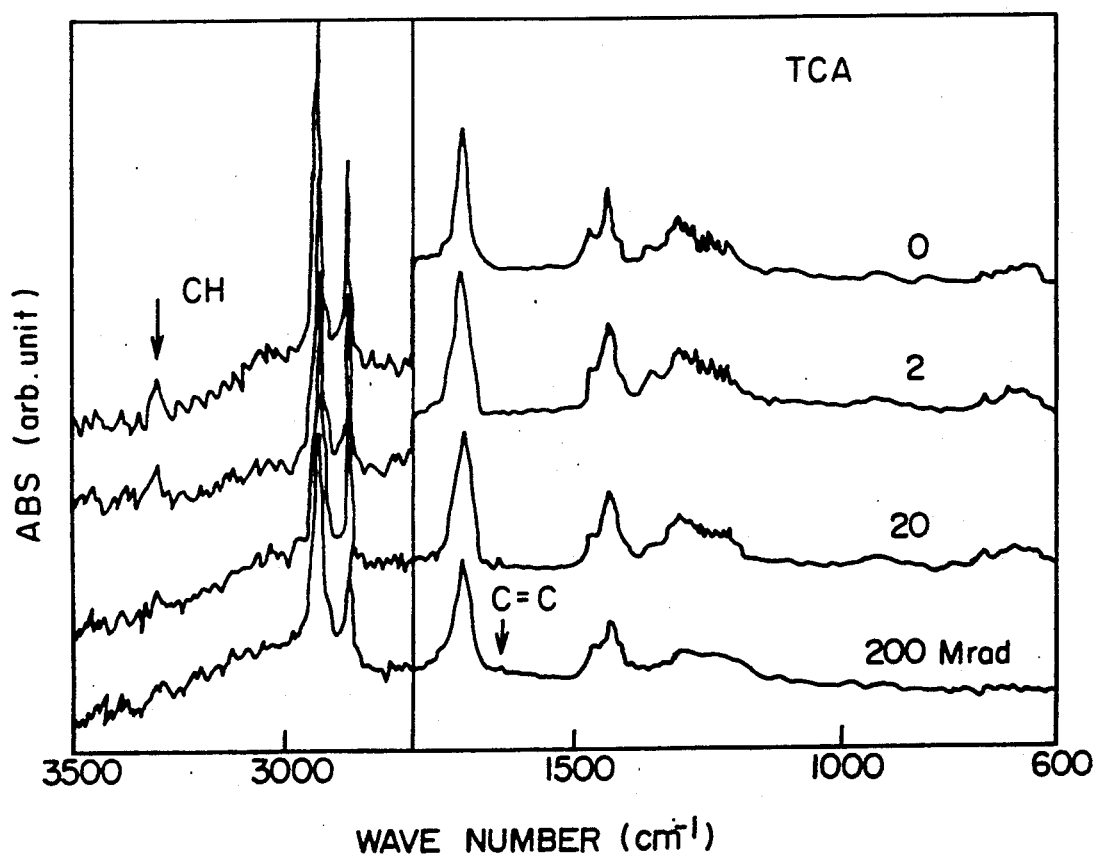
FIG. 3 shows the change of Fourier transfer infrared (FTIR) spectra accompanying electron beams irradiation of TCA.LB films.
Figure 4:
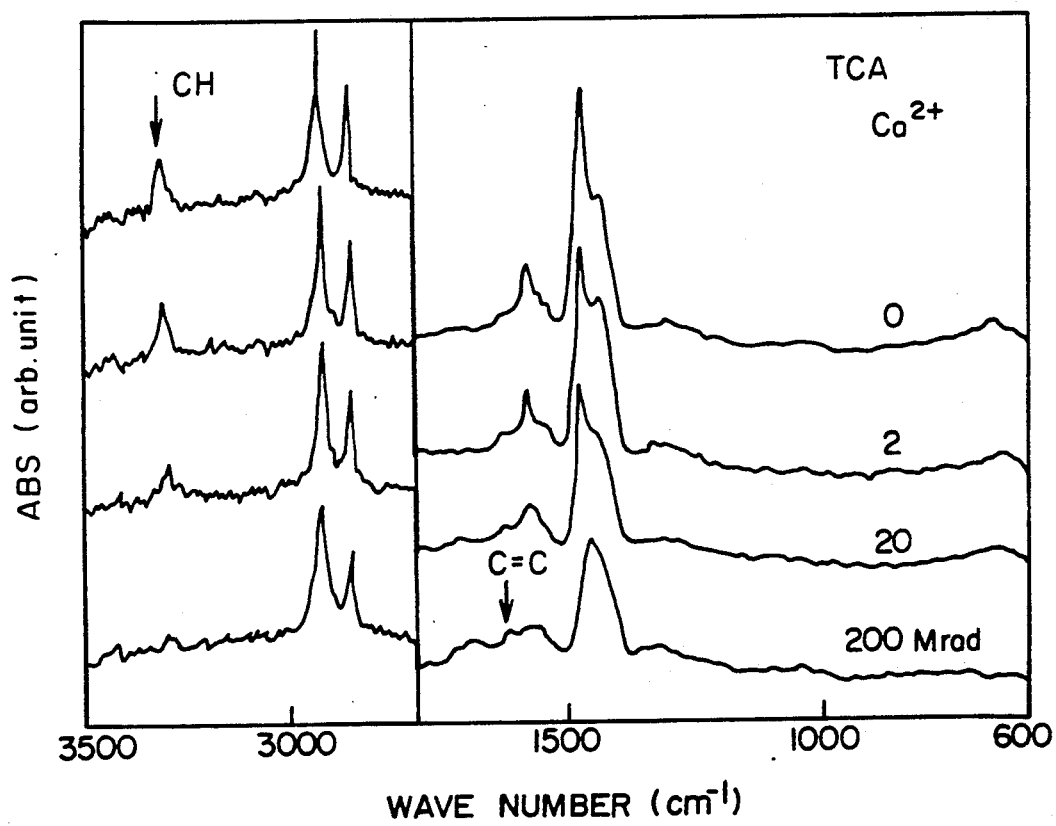
FIG. 4 show the changes of Fourier transform infrared (FTIR) spectra accompanying X-ray irradiation of TCA.LB films.

Next, the reactivity to X-rays of built-up films formed by building up TCA.LB films at the typical points A and B, respectively, in FIG. 1 was measured. The yields of residual film thickness (gamma characteristic) after immersion in ethanol solvent of the built-up films which had been irradiated with X-rays underwent the changes shown in FIG. 2, and both the built-up films became insoluble in the solvent at 100 to 200 mJ/cm². For further chemical analysis, FTIR spectra were measured. FIG. 3 and FIG. 4 show the changes of FTIR spectra accompanying X-ray irradiation of the built-up films obtained by building up TCA.LB films at the points A and B, respectively. As shown in FIG. 3 and FIG. 4, in both the spectra, X-ray irradiation was accompanied with a decrease of absorption at 3300 cm$^{-1}$ (absorption due to ≡CH) and an increase of absorption at 1650 cm$^{-1}$ (absorption due to C=C). From this fact and the fact that the X-ray irradiation resulted in insolubilization of TCA.LB films in the solvent, it can be seen that a polyacetylene having (—CH=CH—)$_n$ linkage was formed. That is, it was proved that there occured a reaction by which the molecular alignment shown in FIG. 5(a) was changed to that shown in FIG. 5(b), namely, production of a polyacetylene.

Figure 6:
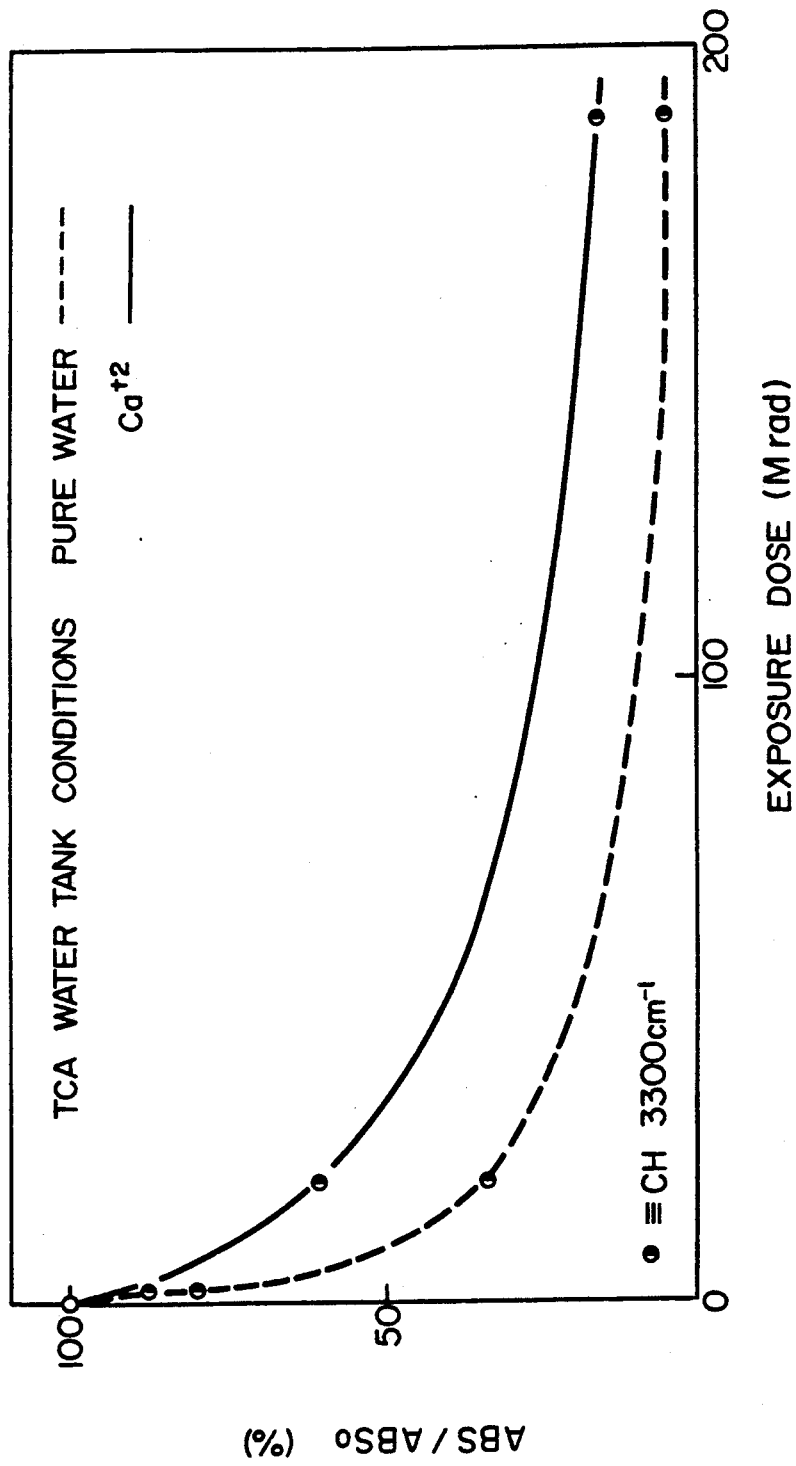
FIG. 6 shows the change of infrared absorption intensity at 3300 cm$^{-1}$ accompanying X-ray irradiation OF TCA.LB films.

FIG. 6 shows the change of intensity of infrared absorption at 3300 cm$^{-1}$ (absorption due to ≡CH) accompanying X-ray irradiation of the built-up films obtained by building up TCA.LB films at the points A and B in FIG. 1. In the case of both the built-up films, X-ray irradiation was accompanied by a decrease of absorption at 3300 cm$^{-1}$, but the built-up film obtained by building up TCA.LB films at the point B was more reactive. Thus, it became clear that when a polyacetylene is produced using TCA.LB films, the molecular orientation and molecular density of TCA molecules at the time of building-up are important.

On the other hand, it was also confirmed that when TCA.L films under each of two conditions corresponding to the points A and B, respectively, in FIG. 1 are directly irradiated with X-rays at a dose of about 100—200 mJ/cm$^2$, polymerization proceeds, resulting in insolubilization of the TCA.L films in ethanol solvent.

Figure 5:
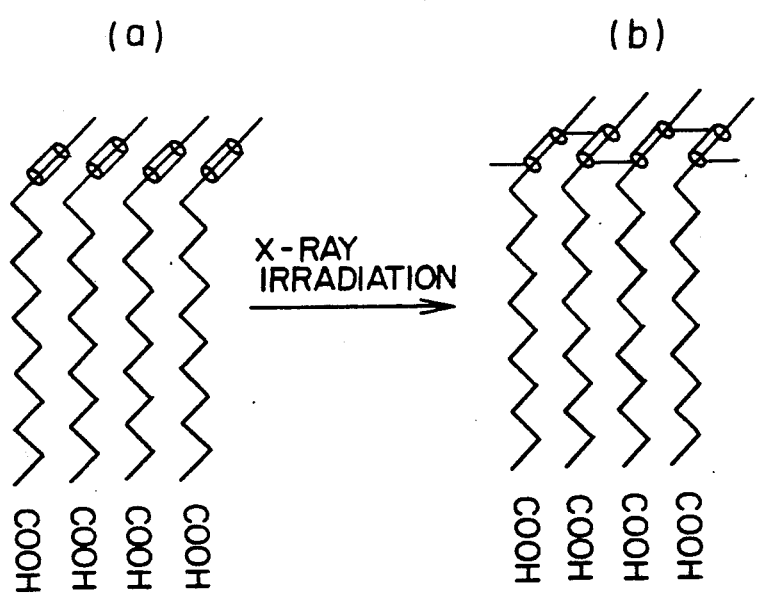
FIG. 5 is a schematic illustration of radiation polymerization process of TCA.LB films.

From the results described above, it was confirmed that in the methods using X-ray polymerization, a TCA.L film or TCA.LB films give a polyacetylene via the radiation polymerization process shown in FIG. 5.

On the other hand, it was confirmed that when a TCA.L film or a TCA.LB film is irradiated with electron beams with high energy (γ-rays have the same effect), the films become insoluble in the solvent also in this case.

The polyacetylene produced in the manner described above was remarkably stable to heat, pressure, ultraviolet rays, etc. even in an atmosphere containing oxygen as compared with polyacetylene derivatives conventionally produced by catalystic methods.

It was confirmed that when diacetylene derivative molecules are gathered up in the surface direction on water surface by means of a barrier or a DC bias of several tens volts is applied in the surface direction during the radiation polymerization, the orientation of monomer molecules is further improved, so that a polyacetylene having a still longer conjugated system can be produced.

Although in the present example, an explanation is given only for TCA.LB films and TCA.L films, it will be apparent that even when build-up conditions are different, the same method as described above can be applied to any substance so long as the substance contains an acetylene (—C≡C—) and can form a LB film. Needless to say, when a group active against water such as —SiCl$_3$ is added in place of the terminal carboxylic acid, a chemical adsorption method can be employed in place of the LB film formation method.

Example 2

Figure 7:
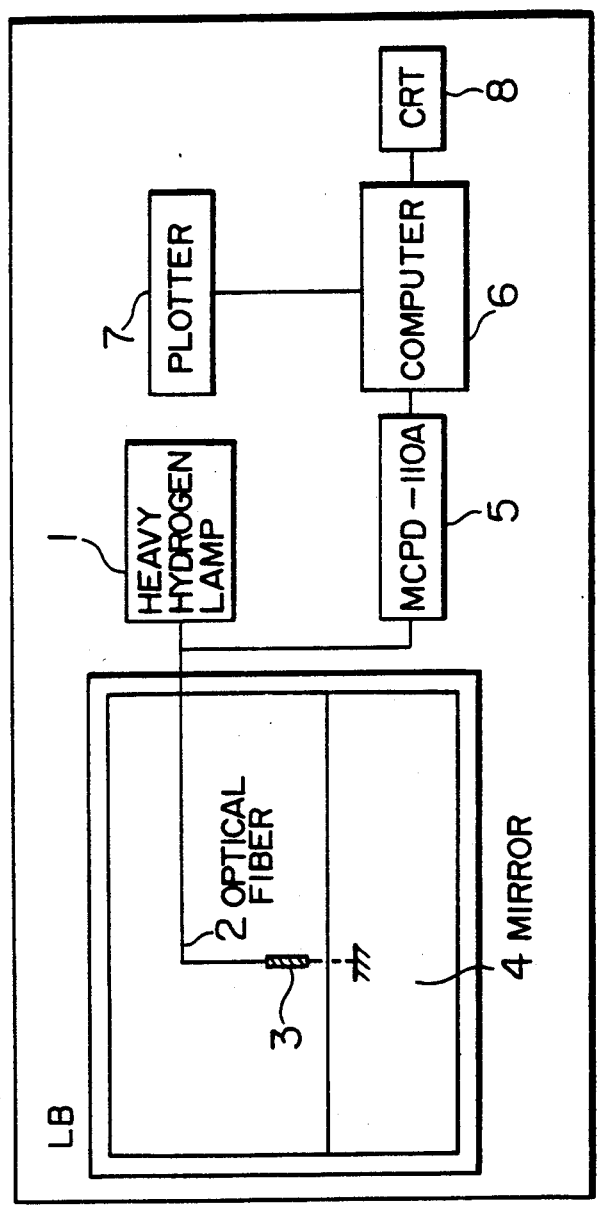
FIG. 7 and FIG. 8 are schematic illustrations of a measuring apparatus used in experiments of the present invention.
Figure 8:
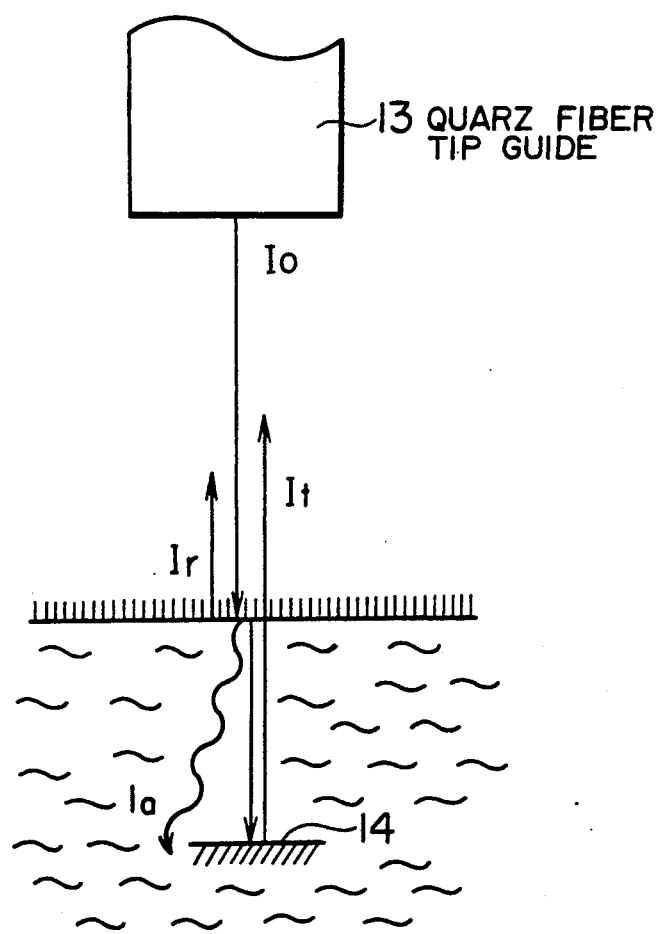

In this example, as a sample, there was used pentacosadiynoic acid (PDA) CH$_3$(CH$_2$)$_{11}$—C≡C—C≡C—(CH$_2$)$_8$COOH which was a diacetylene derivative. Evaluation of the photoreactivity of a L film and building-up of LB films into a film were carried out by the use of Trough IV mfd. by Joice-Loebl Co., Ltd. in a clean room of class 100 irradiated with yellow light free from light having a wavelength of 500 nm or less. In this case, the temperature and humidity inside the clean room were adjusted to 23°±1° C. and 40±5%, respectively. When 25 LB films were built up into a film, the type of build-up changed from Z type to Y type near the tenth LB film in the build-up process. For the building-up, a Si substrate of 3 inches in diameter having an oxide layer formed thereon was used. As radiations for the radiation reaction, X-rays, γ-rays and electron beams were used. As a light source for spectra measurement for confirming the polymerization on water surface, a 200-W deuterium lamp cooled with water for stabilization was used. In this case, the illuminance was 0.05 mW/cm$^2$ in all the measurements. For measuring the photoreactivity of a L film, a direct photometric system using a multi-channel spectrophotometer McPD-110A, mfd. by Otsuka Electronics Co., Ltd. was developed and utilized. This system is characterized in that spectrometry and measurement of light absorption intensity can be carried out by real time while monitoring the π-A curve of a L film. The experimental system is shown in FIG. 7. UV rays from a deuterium lamp 1 which has passed through a optical fiber 2 is introduced through one end of a Y type light guide 3, reflected and returned from a mirror 4 in water, and measured in MCPD-11-A, i.e., a spectrophotometer 5. Numeral 6 shows a computer, numeral 7 a plotter, and numeral 8 a CRT display unit. FIG. 8 is a schematic illustration of a light path near a L film. As shown in FIG. 8, incident light (T$_o$) which has gone out through the end of the light guide is divided in three at the L film interface. That is, it is divided into light (I$_a$) absorbed by the monomolecular film, light (I$_r$) reflected by the interface, and light (I$_t$) which has passed through the interface and has been reflected and returned from an Al mirror. Therefore, in practice, light of I$_r$+I$_t$ is measured, and absorption spectrum of the L film can be measured by measuring the difference between I$_o$ and I$_r$+I$_t$ at each wavelength.

Figure 10:
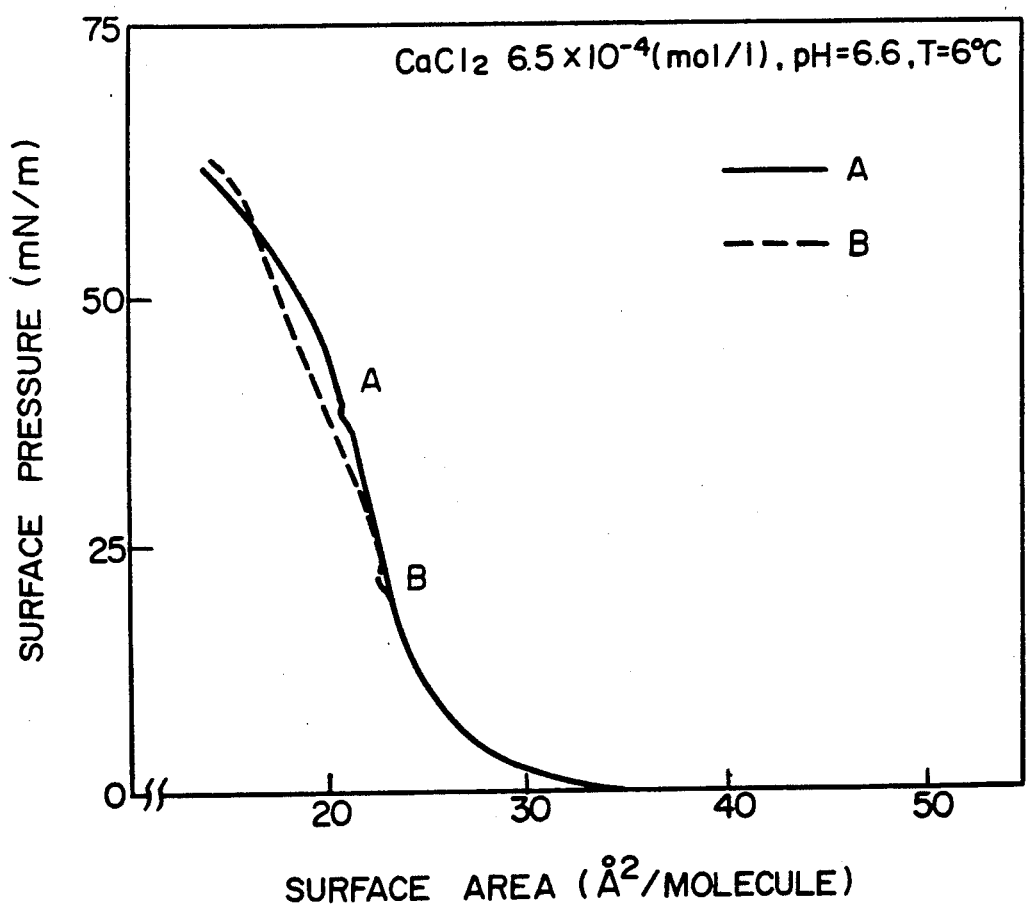
Figure 11:
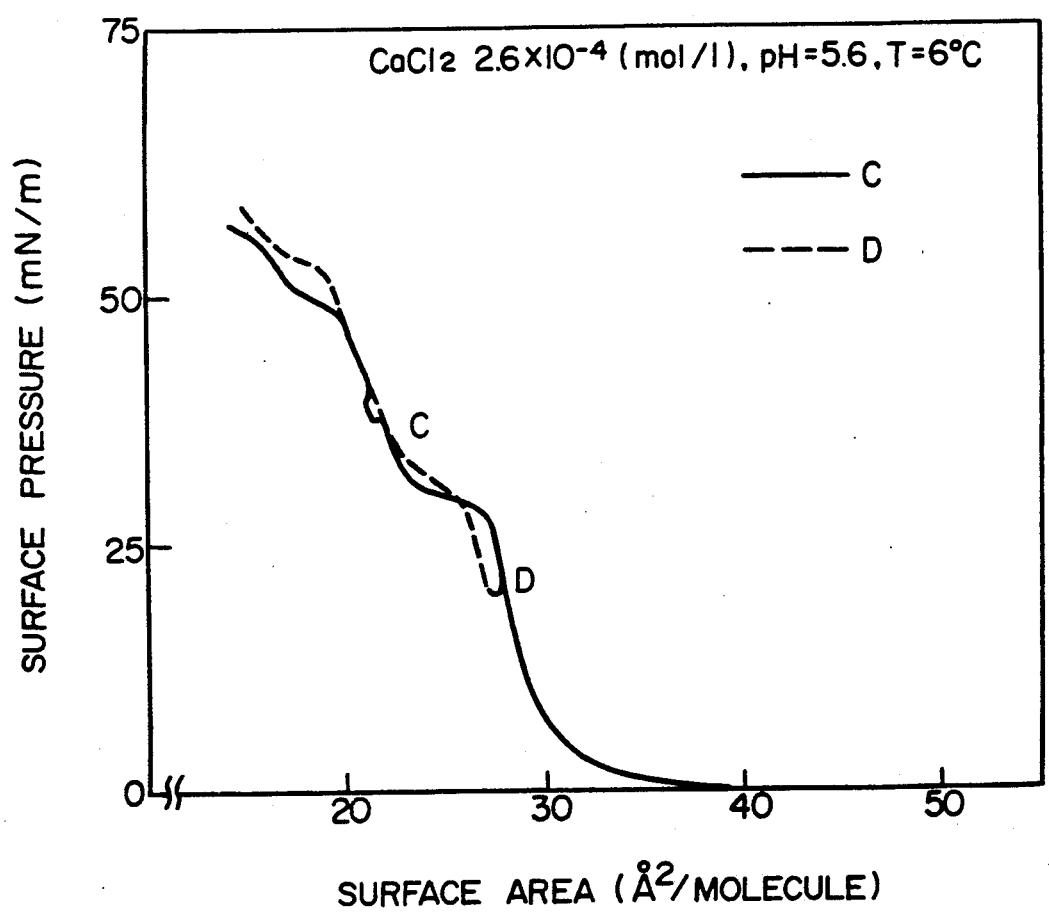
Figure 12:
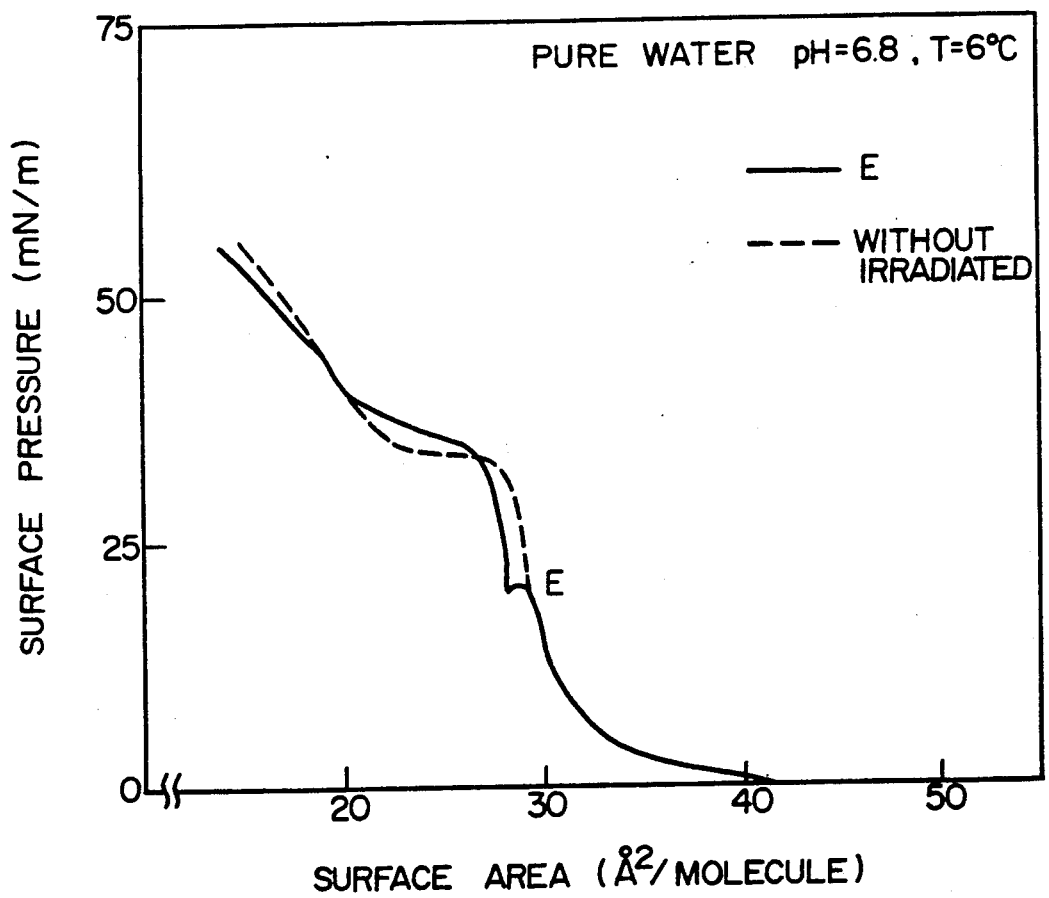
Figure 13:
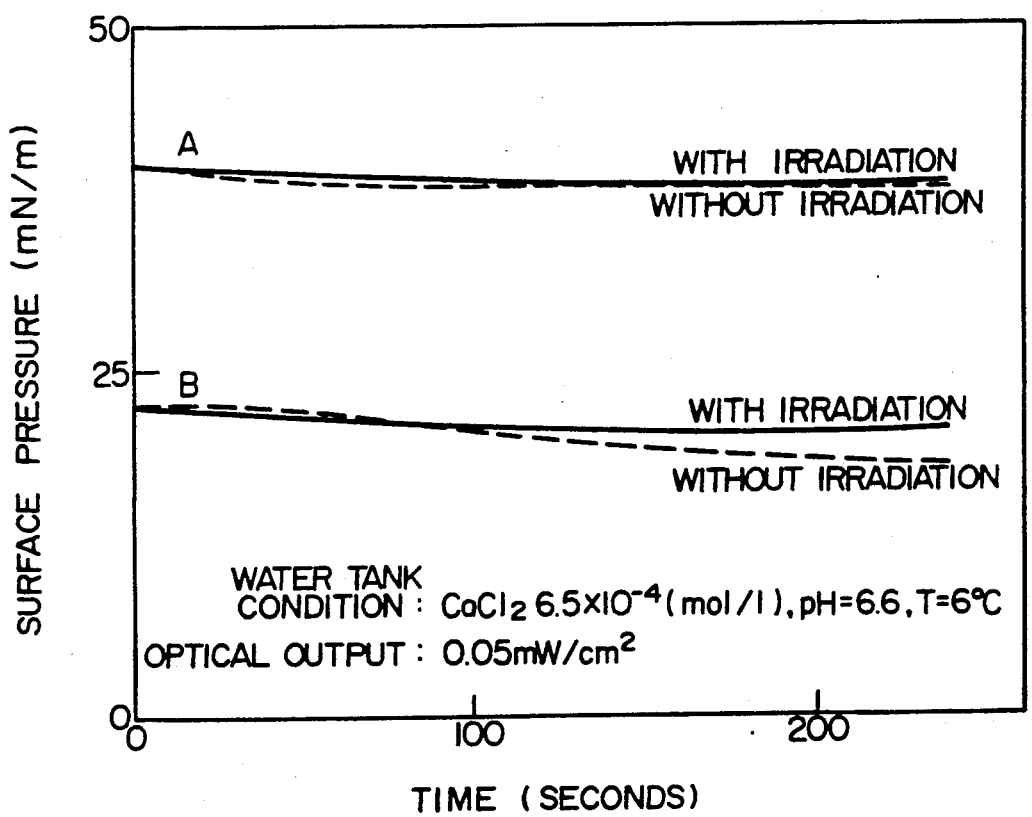
Figure 14:
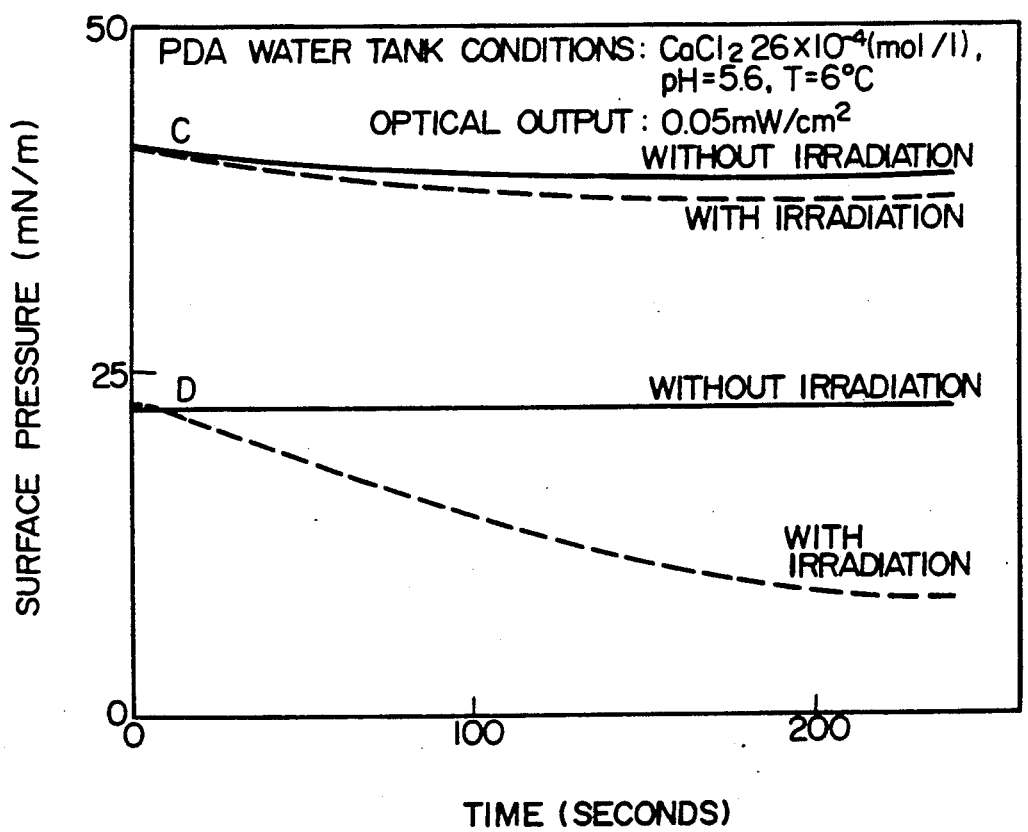
Figure 15:
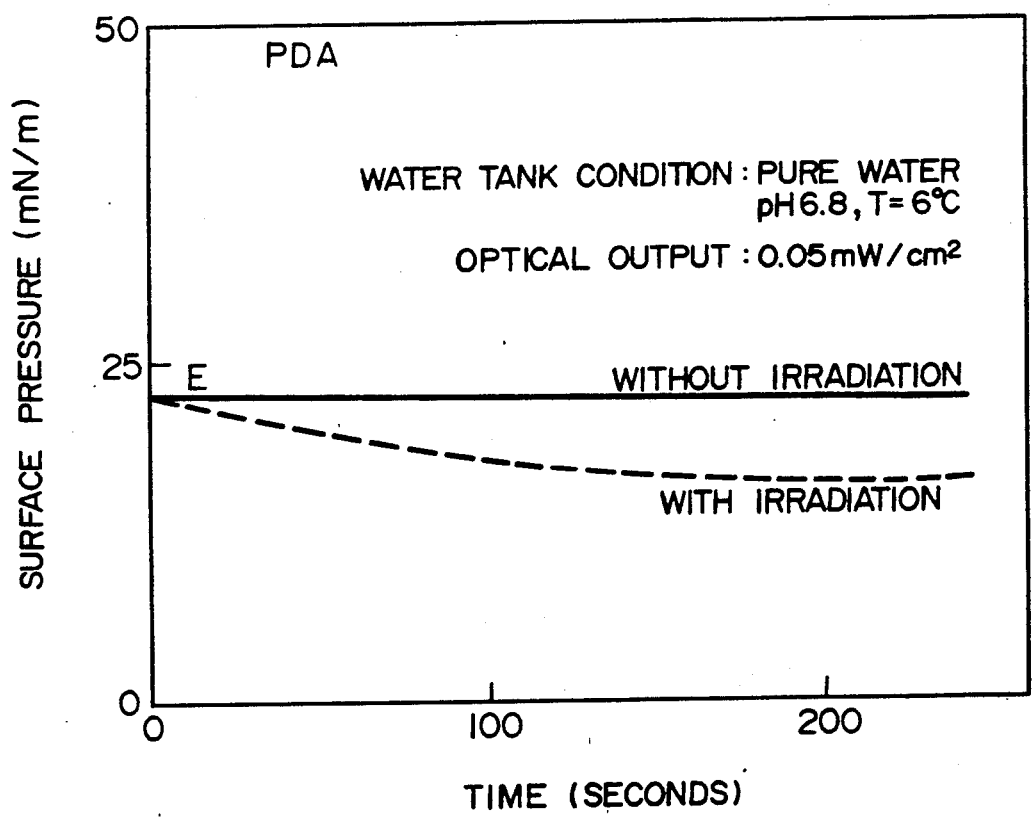
FIG. 15 shows the change of surface pressure accompanying light irradiation of the PDA.L film on the surface of pure water.
Figure 16:
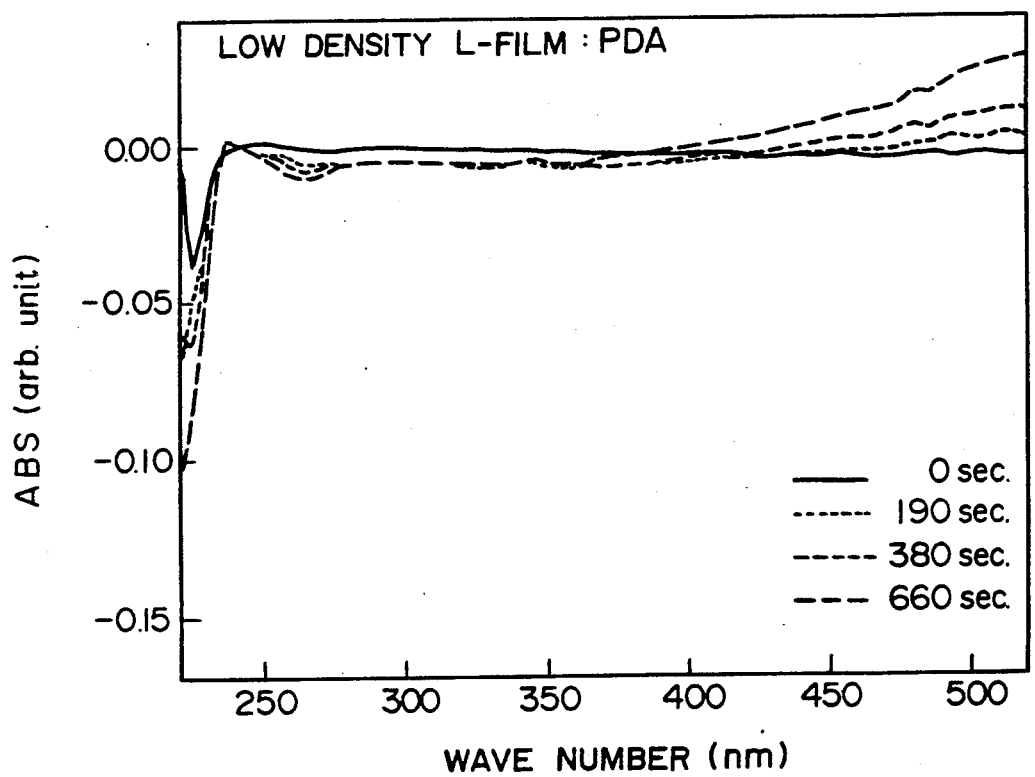
FIG. 16 shows the change of absorption spectrum accompanying UV irradiation of low-density PDA.L film.

First, in order to investigate the influence of molecular density or molecular orientation on the photoreactivity of a PDA.L film, the π-A curve of the L film was measured at various salt concentrations of aqueous phase and at various pH's. Typical three π-A curves are shown in FIG. 13. In FIGS. 10, 11 and 12 are PDA.L films under individual typical conditions (corresponding to the points A, B, C, D and E in FIG. 9) were irradiated all over the surface with ultraviolet rays for 5 minutes each. In FIG. 10 and FIG. 11, two π-A curves in the case of ultraviolet irradiation at the points A and B or the points C and D, respectively, are superposed upon each other. In FIG. 12, a π-A curve in the case of ultraviolet irradiation at the point E and a π-A curve in the case of no ultraviolet irradiation are superposed upon each other. As shown in FIGS. 11 and 12, in the case of a low-density PDA.L film, the molecular occupied area was greatly decreased by photopolymerization. Accordingly, in order to make it clear that the molecular occupied area is decreased by photopolymerization, a barrier for compressing a PDA.L film was fixed under individual conditions (corresponding to the points A, B, C, D and E in FIG. 9), and then the whole surface of the film was irradiated with ultraviolet light. The changes of surface pressure in this case are shown in FIGS. 13, 14 and 15. As shown in FIGS. 13 and 14, there was a large difference in photoreactivity between a high-density PDA.L film (the point A) and a low-density PDA.L film (the point D). There was a large difference in the change of surface pressure between D in FIG. 14 and E in FIG. 15, but in the case of the point D in FIG. 11 and the point E in FIG. 12, substantially the same degrees of reductions of the molecular occupied areas were observed. This difference of the influence of ultraviolet irradiation seems to be due to breakage of PDA L film which was caused during photopolymerization because the aqueous phase for the PDA.L film in FIG. 12 was pure water.

Figure 17:
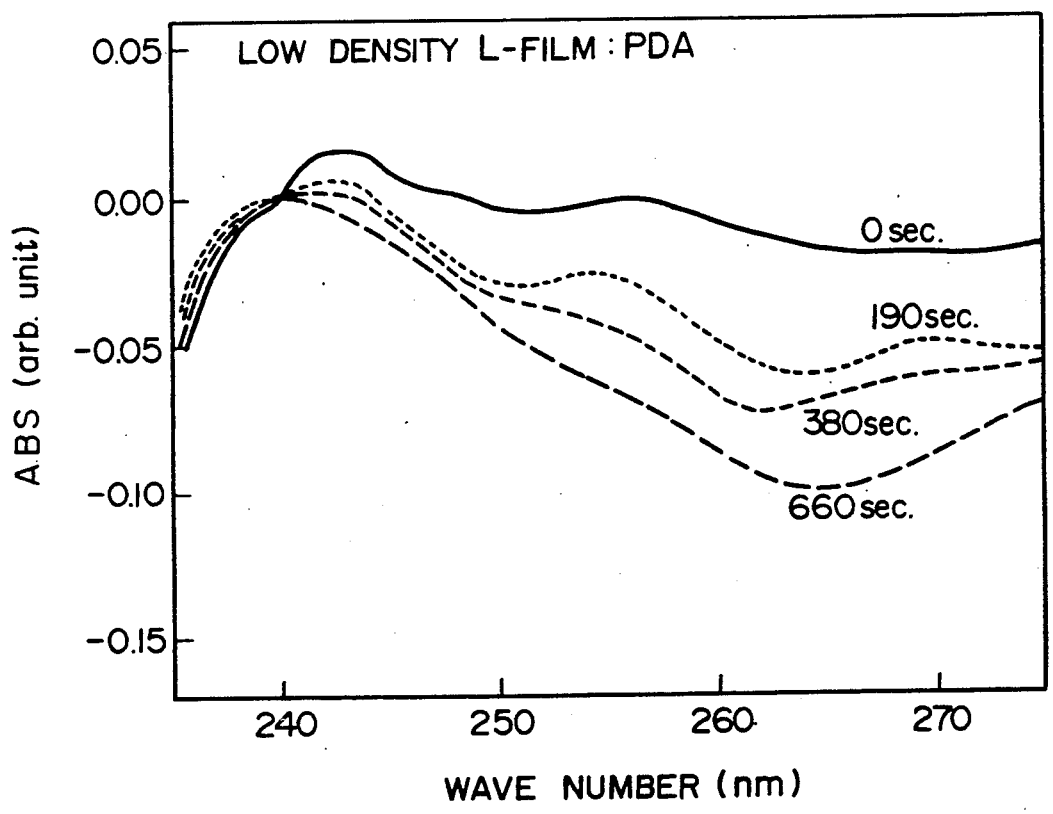
FIG. 17 shows the change of absorption spectrum accompanying UV irradiation of a low-density PDA.L film.
Figure 18:
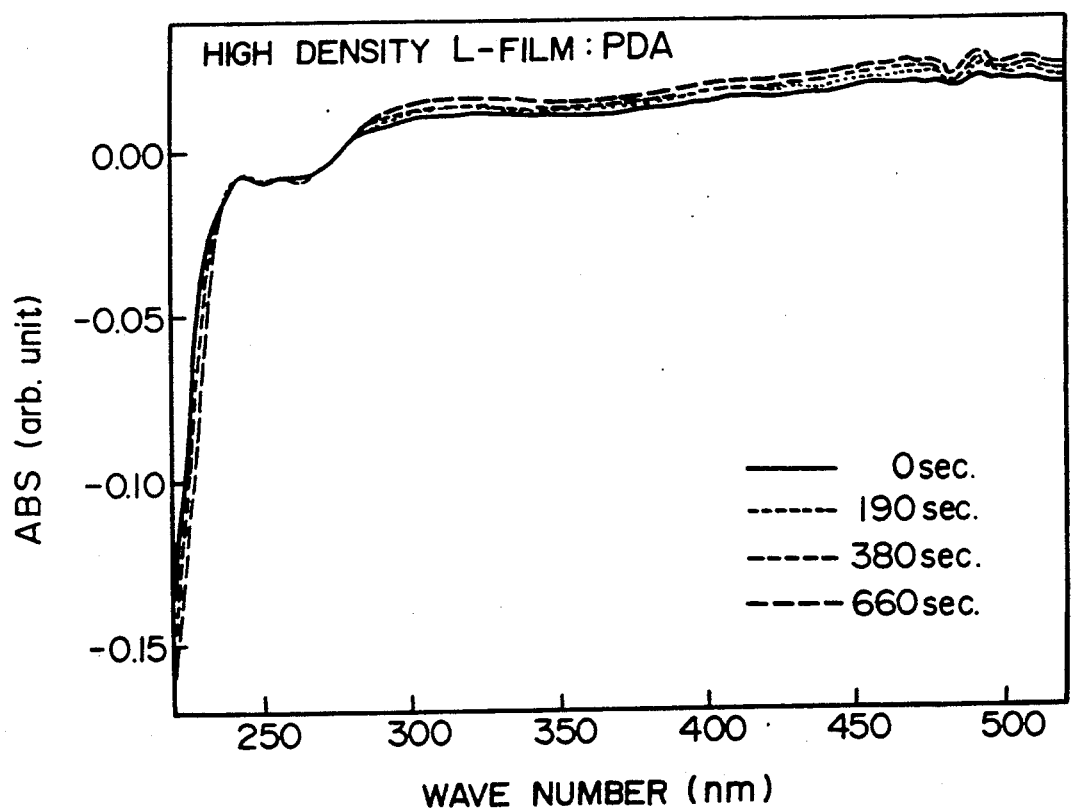
FIG. 18 shows the change of absorption spectrum accompanying UV irradiation of a high-density PDA.L film.
Figure 19:
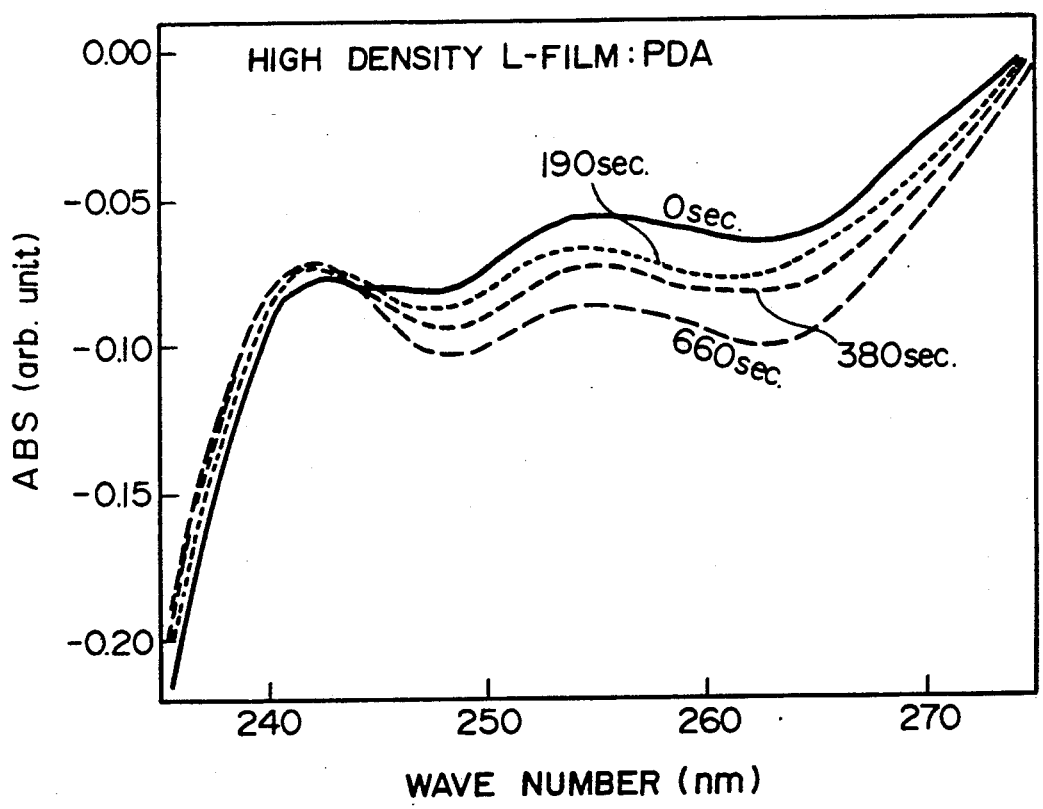
FIG. 19 shows the change of absorption spectrum accompanying UV irradiation of a high-density PDA.L film.

Further, for the typical type points A and D, the spectrum changes of PDA.L films accompanying ultraviolet irradiation are shown in FIGS. 16, 17, 18 and 19. All the spectra show the changes of absorption spectrum accompanying photoreaction of a monomolecular film on water surface. FIGS. 17 and 19 are partially enlarged views of FIGS. 16 and 18, respectively. In both FIGS. 17 and 19, absorption peaks can be confirmed at 242 nm and 255 nm. As shown in FIG. 17, in the case of a low-density PDA.L film, the two absorption peaks disapper owing to ultraviolet irradiation. These absorptions coincide well with those of the action spectra reported by B. Tieke et al. On the other hand, in the case of a high-density PDA.L film, there is, as shown in FIG. 19, almost no change of the absorption peaks even under the same irradiation conditions. The difference in photopolymerizability between the two PDA.L films can be confirmed from FIG. 16 and FIG. 18. That is, in the case of a low-density PDA.L film (FIG. 16), a new absorption appears at 400 nm or more owing to ultraviolet irradiation, but in the case of a high-density PDA.L film, no new absorption appears. Absorption in the visible region of 400 nm or more is generally considered to be due to polydiacetylene or polybutadiene. In the case of a high-density L film, this absorption is not observed at all even when ultraviolet irradiation is carried out. Therefore, it is conjectured that polymerization of PDA.L film has not occurred at all. It will be apparent from the $\pi$-A curve shown in FIG. 13 that such a difference of photoreactivity is attributable to the difference of molecular density or molecular orientation at each surface pressure. In other words, even under the same ultraviolet irradiation conditions, some alignments, of molecules of a PDA.L film contribute to photopolymerization reaction of the PDA.L film, but other alignments do not.

Figure 9:
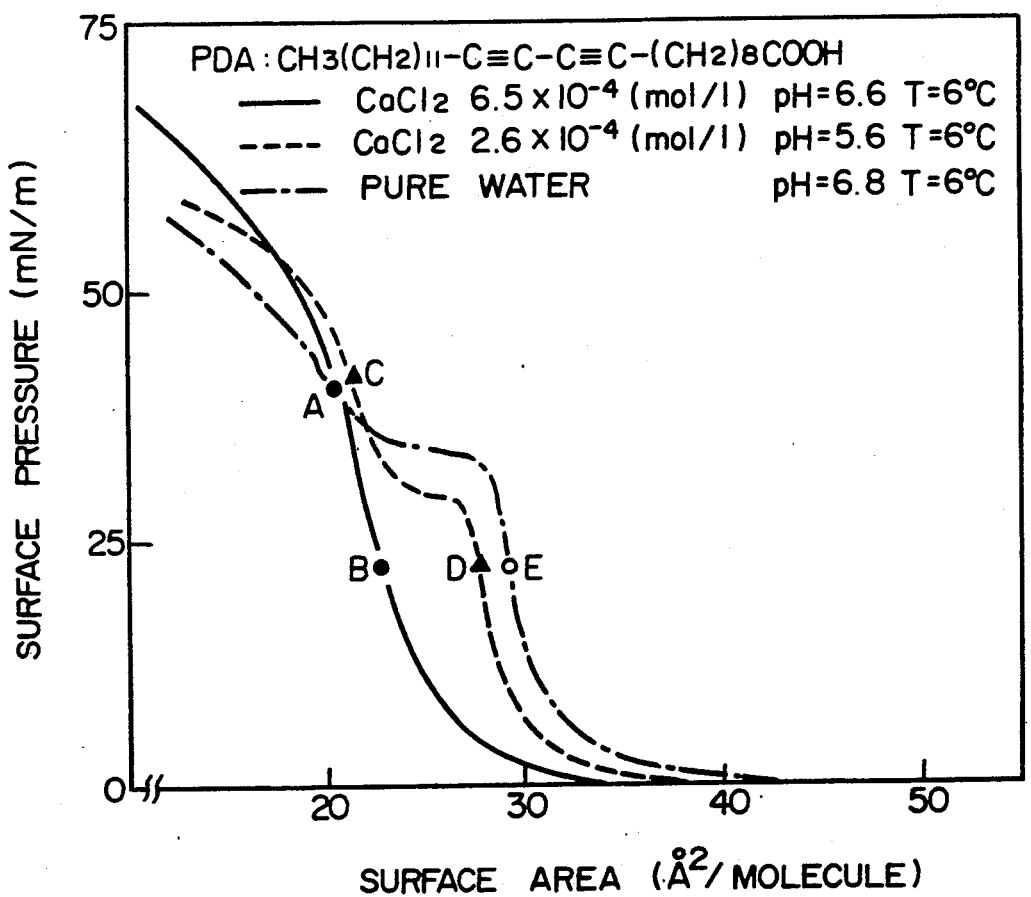
FIGS. 9 to 14 show experiment results.
Figure 20:
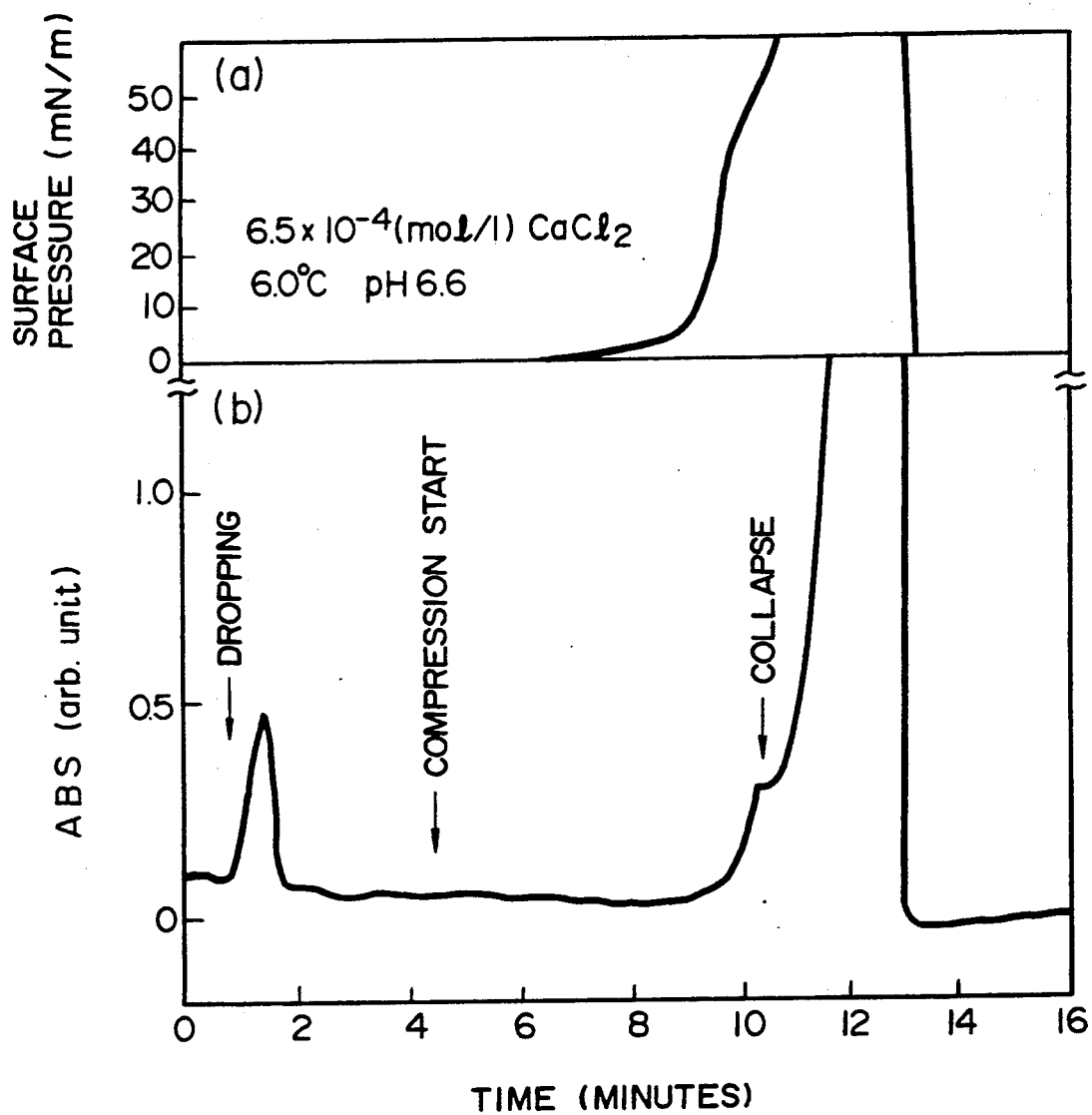
FIG. 20 shows the changes of surface pressure and absorption intensity accompanying movement of a barrier of a PDA.L film on the surface of an aqueous salt solution having a high concentration.
Figure 21:
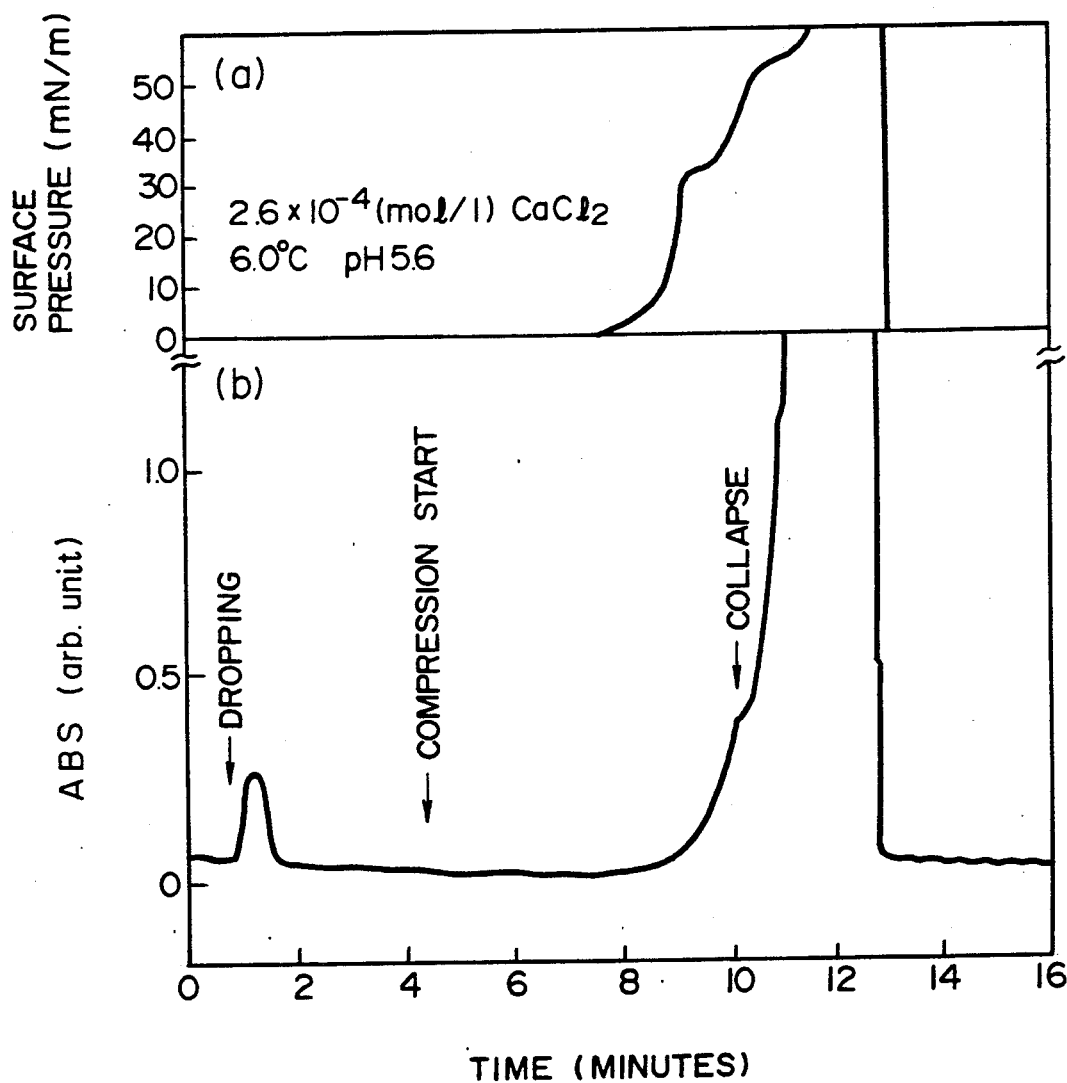
FIG. 21 shows the changes of surface pressure and absorption intensity accompanying movement of a barrier of a PDA.L film on the surface of an aqueous salt solution having a low concentration.

On the other hand, as shown in FIGS. 9, 13 and 14, there was some difference in photoreactivity between films at the points A and C, even when both films had a high density. Therefore, in order to distinguish phase conditions, in particular, collapse region, of a L film clearly, the change of light absorption intensity of a PDA.L film was measured at a fixed wavelength of 242 nm on water surface simultaneously with $\pi$-A curve measurement. Although the collapse region could not be clearly distinguished only by means of $\pi$-A curve, it could be clearly distinguished on the basis of the sharp change of light absorption intensity shown in FIG. 20(b) and FIG. 21(b). The difference of states of the film at the points A and C was confirmed from FIGS. 20 and 21 as follows. The film was in a complete solid film state at the point A but its phase was in the boundary region between solid film region and collapse region at the point C. That is, the disorder of molecular orientation caused at the point C in the PDA.L film seems to be attributable to the photopolymerization which occurred a little in spite of the high-density region.

From the results described above, it has been clear that a diacetylene L film cannot be subjected to polymerization by the use of ultraviolet rays unless the surface pressure is lower than a certain value, and that even when it is subjected to polymerization by the use of ultraviolet rays between a certain surface pressure, a polydiacetylene is formed.

However, it was confirmed that when a diacetylene L film at the point A is irradiated with radiation having higher energy than ultraviolet rays, e.g., X-rays at a dose of about 20 mrad, the diacetylene L film undergoes polymerization to become insoluble in ethanol solvent.

Figure 22:
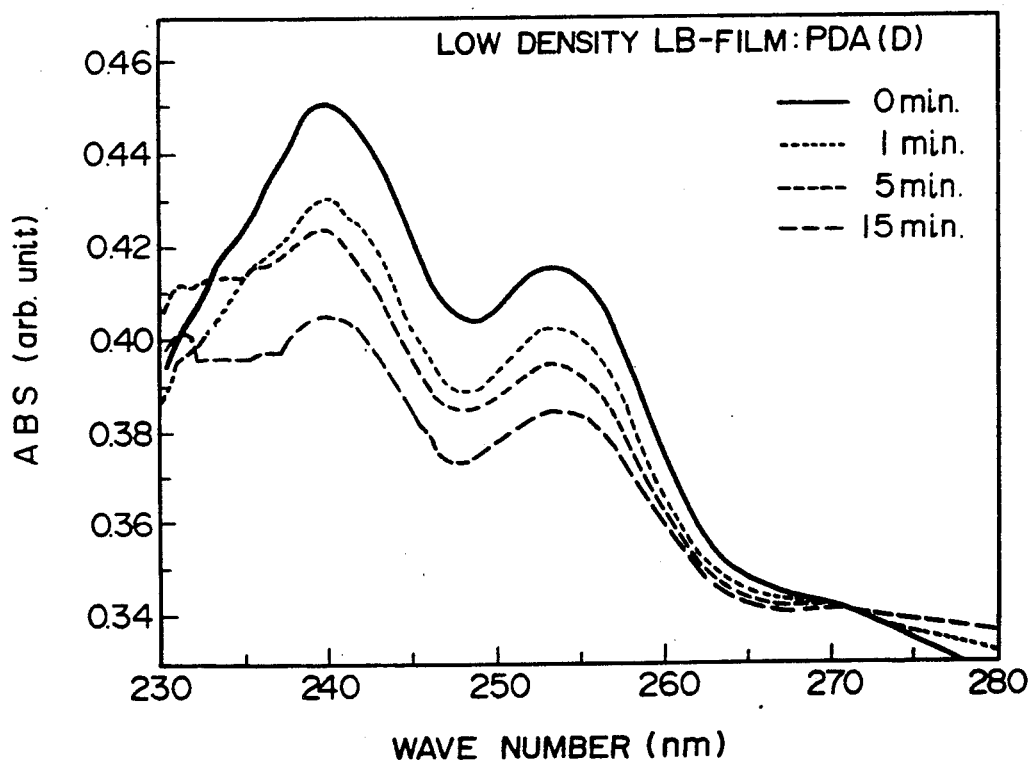
FIG. 22 shows the changes of absorption spectra accompanying UV irradiation of a low-density PDA.LB film.
Figure 23:
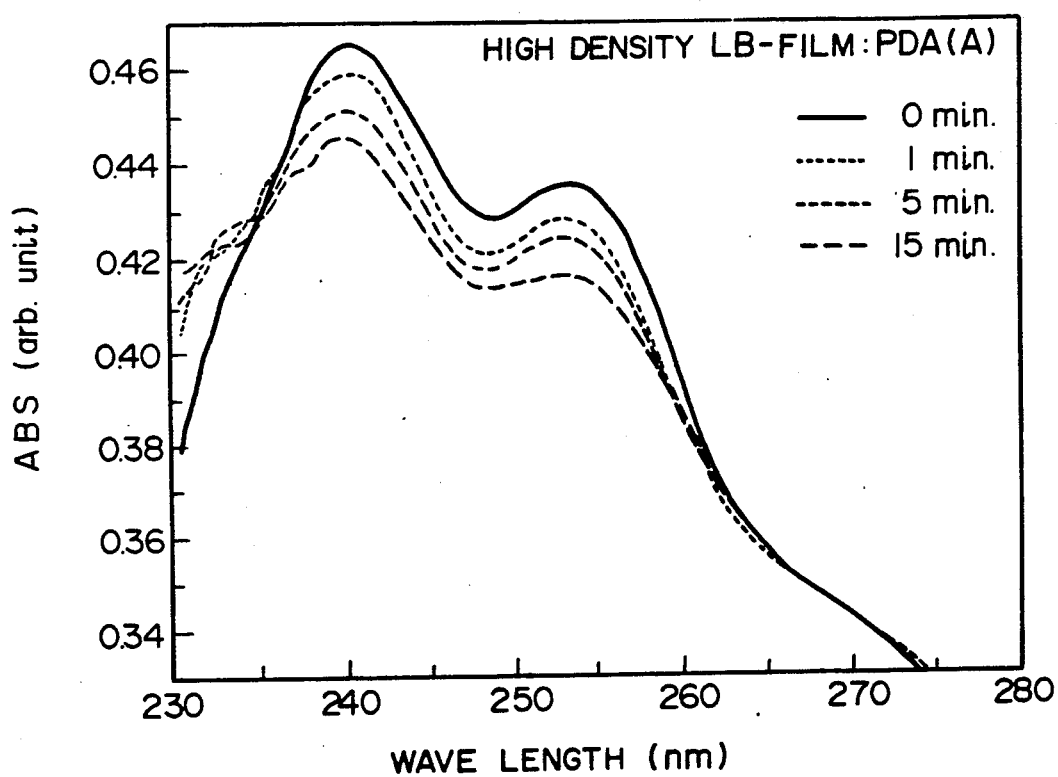
FIG. 23 shows the change of absorption spectrum accompanying UV irradiation of a high-density PDA.LB film.

On the other hand, in order to known whether the photoreactivity in the case of a L film is retained in a LB film, the photoreactivity of built-up films obtained by building up PDA.LB films at the typical points A and D, respectively, was investigated. FIG. 22 shows the change of spectrum accompanying UV irradiation of the low-density PDA.LB films built up at the point D in FIG. 9, and FIG. 23 shows the change of spectrum accompanying UV irradiation of the low-density PDA.LB films build up at the point a in FIG. 9. The absorption of these spectra also coincide well with those of the action spectra reported by B. Tieke et al. Although some change of absorption is observed in FIG. 23, a rapid decrease of absorption is observed in the first 1 minute in FIG. 22, as compared with FIG. 23. Therefore, as is clear from comparison between FIGS. 22 and 23 and FIGS. 17 and 19, the molecular orientation and the molecular density of PDA.L film at the time of building-up are substantially retained in PDA.LB film. The progress of photopolymerization to some degree in the high-density PDA.LB films (FIG. 23) seems to result from a disorder of the orientation at the time of building-up of the LB films.

Figure 24:
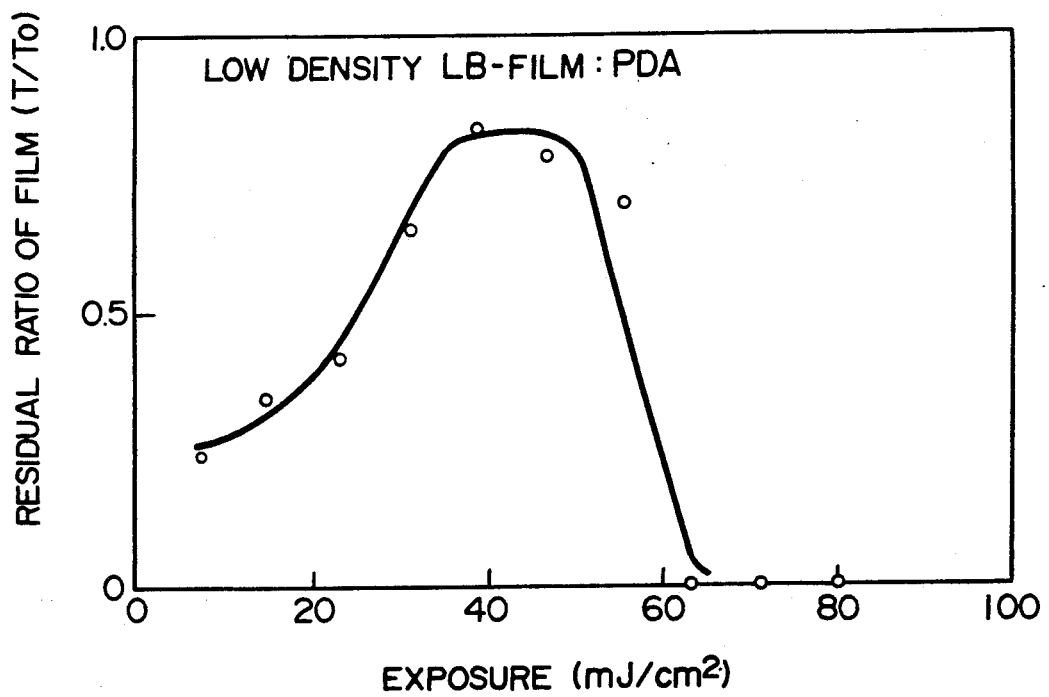
FIG. 24 shows the change of the yield of residual film thickness accompanying UV irradiation of a high-density PDA.LB film.

Further, in FIG. 24 is shown a curve obtained for low-density PDA.LB films by plotting, against light exposure, the yields of residual film thickness of samples exposed at various doses which were measured after dissolving and removing the samples by immersion in ethanol. The data shown in FIG. 24 are the results obtained when 50 PDA.LB films built up into a film were irradiated with ultraviolet rays and then removed by dissolution in ethanol. The yield of residual film thickness of PDA.LD films built up into a film at the point D showed a peak at 40 to 50 mJ/cm$^2$ and decreased with an increase of the light exposure. From this fact, it is predicted that low-density PDA.LA films undergo polymerization on ultraviolet irradiation but that the poly-PDA.LB films after polymerization undergo photo-degradation. On the other hand, in the case of PDA.LB films build up into a film at the point A, the yield of residual film thickness was zero for all exposed samples. Therefore, in spite of ultraviolet irradiation, almost no polymerization was observed.

However, it was confirmed that when PDA.LB films built up into a film under that condition, namely, at the point A are irradiated with X-rays at a dose of about 40–50 mJ/cm$^2$, the LB films undergo polymerization to become insoluble in the solvent.

Figure 25:
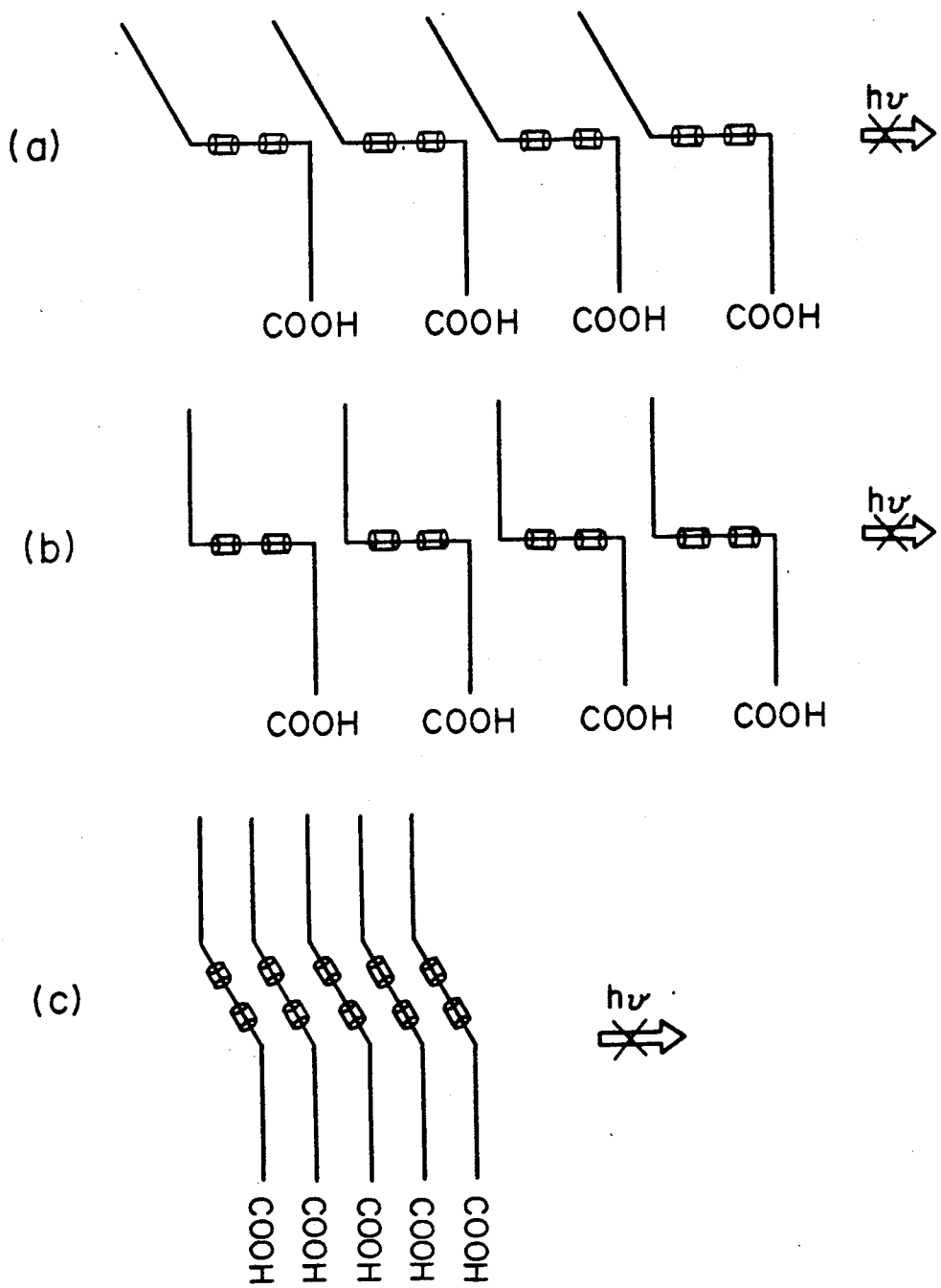
FIG. 25($a$), ($b$) and ($c$) show models of orientation of a PDA.L film which cause no photoreaction.
Figure 26:
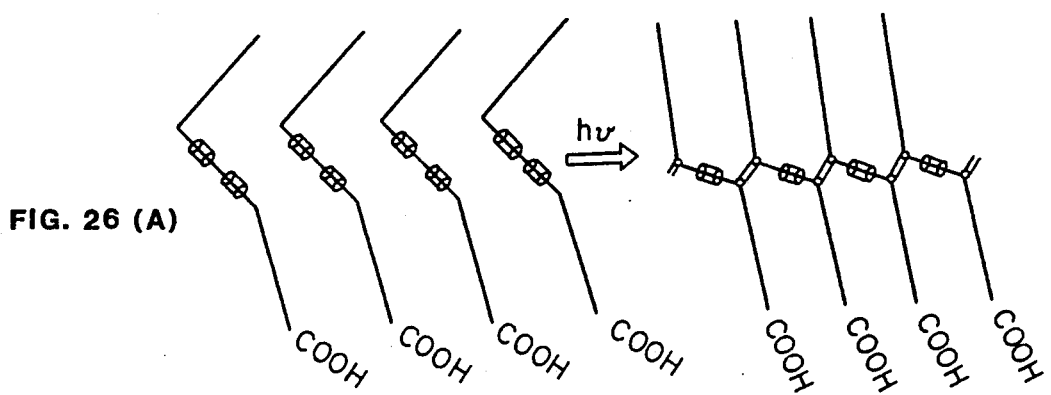
FIG. 26 shows photoreaction pocesses of a low-density PDA.L film.
Figure 26:
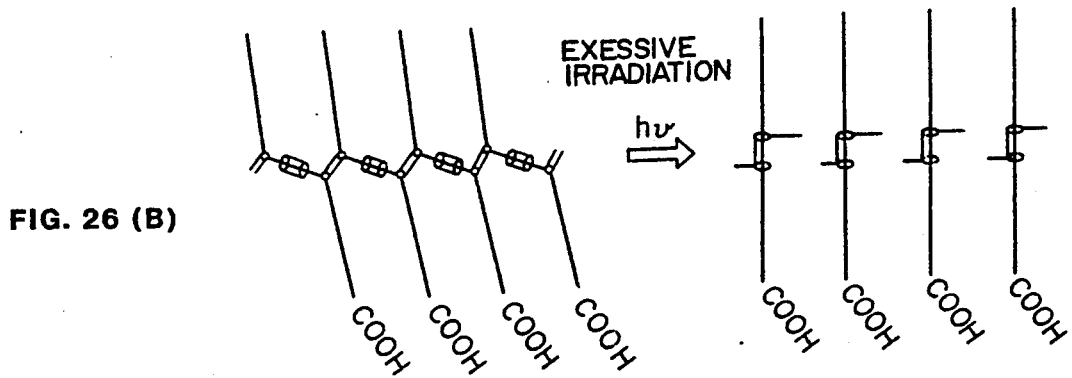

From the results described above, it was confirmed that when a method using ultraviolet polymerization is employed, a PDA.L film does not undergo the photoreaction processes shown in FIG. 25(a), (b) and (c) but undergo the reaction processes shown in FIG. 26, i.e., polymerization by formation of a polydiacetylene linkage at a low molecular density.

Figure 27:
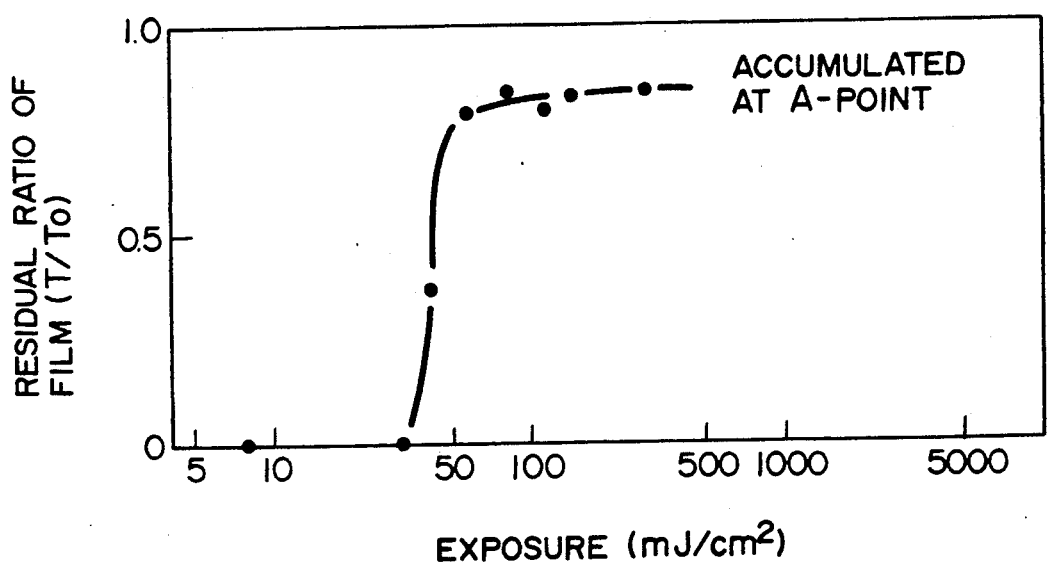
FIG. 27 shows the change of the yield of residual film thickness accompanying X-ray irradiation of a high-density PDA.LB film.
Figure 28:
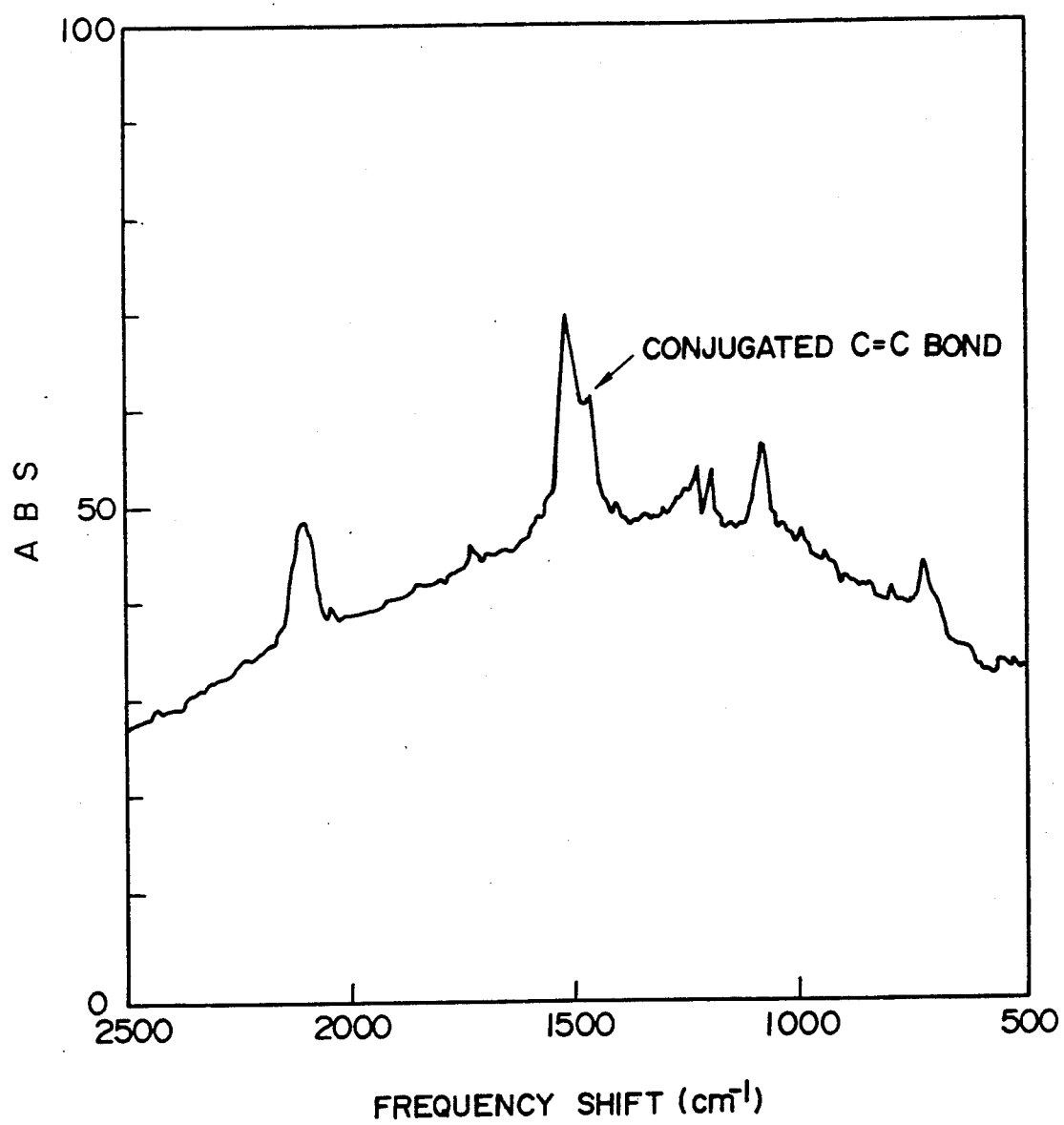
FIG. 28 shows the change of Raman spectrum accompanying X-ray irradiation of a high-density PDA.LB film.
Figure 29:
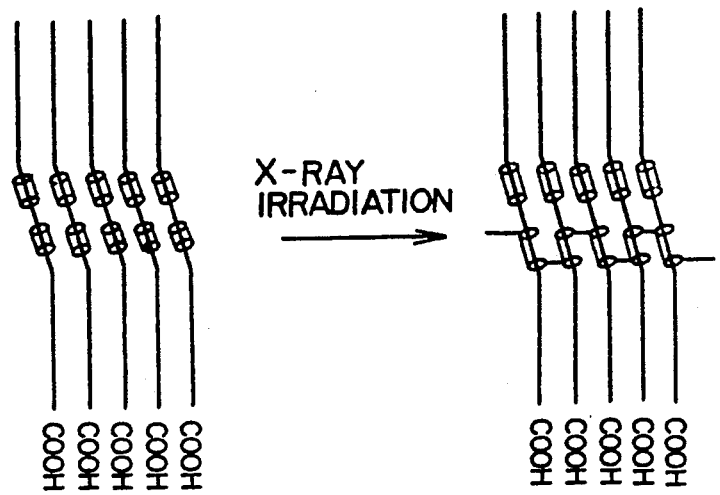
FIG. 29($a$), ($b$), ($c$) and ($d$) show reaction processes for production of a polyacetylene by X-ray irradiation of a high-density PDA.L film.
Figure 29:
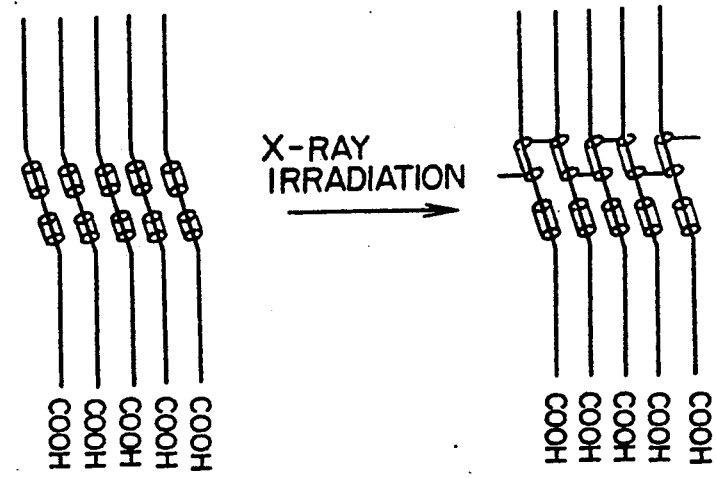
Figure 29:
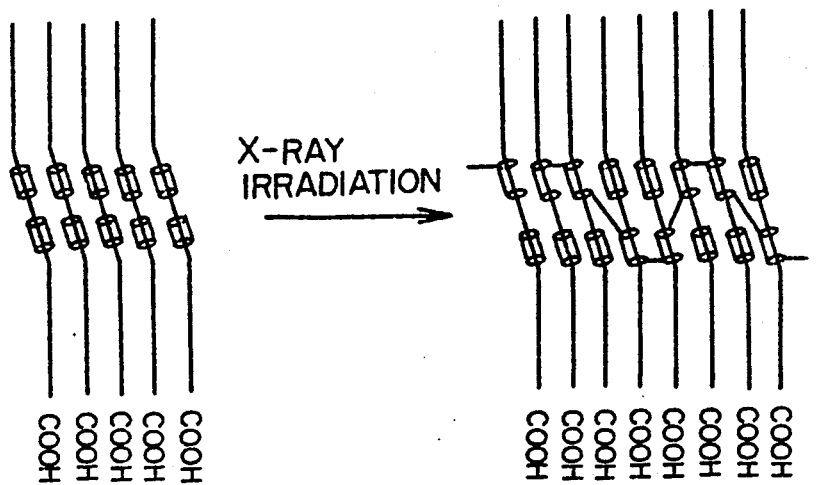
Figure 29:
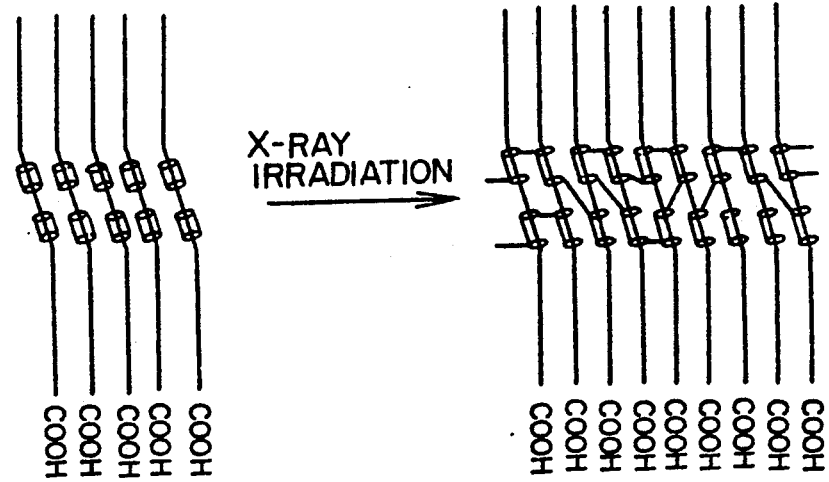
Figure 34A:
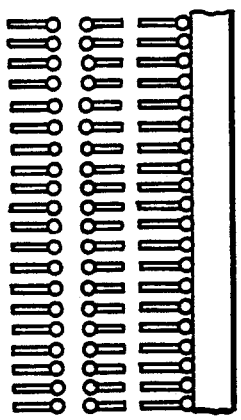
FIG. 34($a$) shows the Y-type structure of a built-up film.
Figure 34B:
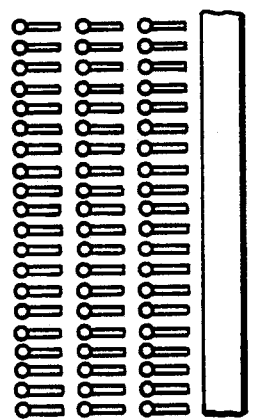
Figure 34C:
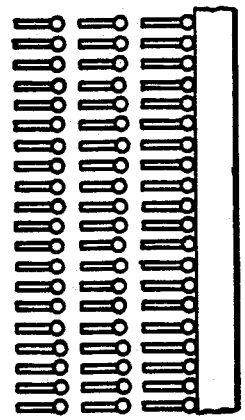

On the other hand, when high-density PDA.LB films were irradiated with radiation with high energy such as X-rays (electron beams and γ-rays have the same effect as that of X-rays), the PDA.LB films became insoluble in ethanol solvent. That is, when diacetylene.LB films built up into a film at the point A were irradiated with X-rays, the yield of residual film thickness changed as shown in FIG. 27 and the films became insoluble in the solvent at a dose of 40 to 50 mJ/cm$^2$. For further chemical analysis, Raman spectrum was measured to confirm an absorption due to —C≡C— of polyacetylene as shown in FIG. 28. That is, it was proved that the molecular alignment shown in FIG. 25 (c) results in the reaction shown in FIG. 29, namely, production of a polyacetylene.

It was also confirmed that when diacetylene derivative molecules are gathered up in the surface direction on water surface by means of a barrier or a DC bias of several tens volts is applied in the surface direction during the radiation polymerization, the orientation of monomer molecules is further improves, so that a polyacetylene having a still longer conjugated system can be produced.

The polydiacetylene derivative used in this invention is not limited to PDA and may be any material so long as the material can form a LB film.

EFFECTS OF THE INVENTION

By employing the process of the present invention, a stable polyacetylene very excellent in electrical conductivity and nonlinear optical effect can be efficiently produced. According to this process, it is theoretically possible to produce a straight-chain, ultra-high-molecular-weight polyacetylene having a continuous conjugated system of several millimeters to several meters in length. Therefore, this process is very useful for producing a device utilizing linear optical effect.

It seems that in further, proper selection of the kind of a diacetylene derivative monomer as starting material and production conditions will make it possible to produce a stable, straight-chain, ultra-high-molecular-weight polyacetylene having a continuous conjugated system of several millimeters to several meters in length. Therefore, it may become possible to produce an organic superconducting substance requiring no cooling, by the process of the present invention.

What is claimed is:

1. A process of producing a polymer having polyacetylene bonds which comprises
    spreading on a water surface a solution of a substance containing an acetylene (—C≡C—) group dissolved in an organic solvent,
    evaporating the organic solvent,
    gathering up molecules of the substance containing an acetylene group which remain on the water surface, in the water surface direction on the water surface by means of a barrier, and
    polymerizing the molecules on the water surface by irradiation with radiation selected from the group consisting of X-rays, electron beams, and γ-rays, while applying a predetermined surface pressure to the molecules in the water surface direction.

2. A process for producing a polyacetylene according to claim 1, wherein the polymerization is carried out while applying a direct-current electric field in a direction parallel to the water surface simultaneously with the application of the predetermined surface pressure.

3. A process for producing a polyacetylene according to claim 1 or 2, wherein the water contains an inorganic salt.

4. A process for producing a polyacetylene according to claim 1, wherein the substance containing an acetylene group is tricosynoic acid.

5. A process for producing a polymer having polyacetylene bonds which comprises
    spreading on a water surface a solution of a substance containing a diacetylene (—C≡C—C≡C—) group dissolved in an organic solvent,
    evaporating the organic solvent,
    gathering up molecules of the substance containing a diacetylene group which remain on the water surface, in the water surface direction on the water surface by means of a barrier,
    building up the molecules on a predetermined substrate under a surface pressure of 35-50 nM/m, and
    subjecting the thin film containing a diacetylene group thus built up on the substrate to polymerization by irradiation with radiation selected from the group consisting of X-rays, electron beams, and γ-rays.

6. A process for producing a polyacetylene according to claim 5, wherein in the step of building up the molecules on the predetermined substrate while applying the predetermined surface pressure, the building-up is conducted while applying a direct-current electric field in a direction parallel to the water surface simultaneously with the application of the predetermined surface pressure.

7. A process for producing a polyacetylene according to claim 5 or 6, wherein the water contains an inorganic salt.

8. A process for producing a polyacetylene according to claim 5, wherein the substance containing a diacetylene group is pentacosadiynoic acid.

9. A process for producing a polymer having polyacetylene bonds which comprises
    spreading on a water surface a solution of a substance containing a diacetylene (—C≡C—C≡C—) group dissolved in an organic solvent,
    evaporating the organic solvent,
    gathering up molecules of the substance containing a diacetylene group which remain on the water surface, in the water surface direction on the water surface by means of a barrier, and
    polymerizing the molecules by irradiation with radiation selected from the group consisting of X-rays, electron beams, and γ-rays on the water surface, while applying a predetermined surface pressure to the molecules in the water surface direction.

10. A process for producing a polyacetylene according to claim 9, wherein the polymerization is carried out while applying a direct-current electric field in a direction parallel to the water surface simultaneously with the application of the predetermined surface pressure.

11. A process for producing a polyacetylene according to claim 9 or 10, wherein the water contains an inorganic salt.

12. A process for producing a polyacetylene according to claim 9, wherein the substance containing a diacetylene group is pentacosadiynoic acid.

* * * * *